US012313201B2

(12) United States Patent
Whittemore

(10) Patent No.: US 12,313,201 B2
(45) Date of Patent: May 27, 2025

(54) FLEXIBLE AIR DUCT SYSTEMS AND METHODS OF INSTALLATION AND USE THEREOF

(71) Applicant: Zipwall, LLC., Arlington, MA (US)

(72) Inventor: Jeffrey P. Whittemore, Arlington, MA (US)

(73) Assignee: Zipwall, LLC, Arlington, MA (US)

( * ) Notice: Subject to any disclaimer, the term of this patent is extended or adjusted under 35 U.S.C. 154(b) by 706 days.

(21) Appl. No.: 17/416,646

(22) PCT Filed: Jan. 13, 2020

(86) PCT No.: PCT/US2020/013415
§ 371 (c)(1),
(2) Date: Jun. 21, 2021

(87) PCT Pub. No.: WO2020/146904
PCT Pub. Date: Jul. 16, 2020

(65) Prior Publication Data
US 2022/0074523 A1    Mar. 10, 2022

Related U.S. Application Data

(60) Provisional application No. 62/791,233, filed on Jan. 11, 2019, provisional application No. 62/931,380, filed on Nov. 6, 2019, provisional application No. 62/791,306, filed on Jan. 11, 2019, provisional application No. 62/893,465, filed on Aug. 29, 2019.

(51) Int. Cl.
F16L 5/00     (2006.01)
E04G 21/24   (2006.01)
E04G 21/30   (2006.01)
F24F 13/02   (2006.01)
F24F 13/06   (2006.01)

(52) U.S. Cl.
CPC .............. *F16L 5/00* (2013.01); *E04G 21/243* (2013.01); *E04G 21/30* (2013.01); *F24F 13/0254* (2013.01); *F24F 13/0218* (2013.01); *F24F 13/06* (2013.01)

(58) Field of Classification Search
CPC ................................ F16L 5/00; E04G 21/243
See application file for complete search history.

(56) References Cited

U.S. PATENT DOCUMENTS 642,236 A    1/1900  Larimer
670,585 A    3/1901  Fowler
(Continued)

FOREIGN PATENT DOCUMENTS

BE    1011260    6/1999
CA    3121808    6/2020
(Continued)

OTHER PUBLICATIONS

Canadian Office Action dated Dec. 15, 2023 issued in Canadian Application No. 3125232.
(Continued)

*Primary Examiner* — Allen R. B. Schult
(74) *Attorney, Agent, or Firm* — Onello & Mello, LLP

(57) ABSTRACT

A housing is constructed and arranged to be mounted to a curtain. The housing can include an aperture. Upon installation of the housing to the curtain, a portion of the curtain is removed in the region of the aperture. A flexible air duct can be presented through the aperture.

32 Claims, 32 Drawing Sheets

(56) References Cited

U.S. PATENT DOCUMENTS

| | | |
|---|---|---|
| 827,000 A | 7/1906 | Dinsmore |
| 1,705,625 A | 3/1929 | Mitchell |
| 1,766,324 A | 6/1930 | Berner |
| 2,219,169 A | 10/1940 | Alter |
| 2,232,194 A | 2/1941 | Zogby |
| 2,474,158 A | 6/1949 | Neely |
| 2,487,585 A | 11/1949 | Pencek |
| 2,816,769 A | 12/1957 | Noble |
| 2,903,227 A | 9/1959 | de Kalb Key |
| 2,942,829 A | 6/1960 | Stiffel |
| 2,974,805 A | 3/1961 | Brossean |
| 3,072,784 A | 1/1963 | Mann |
| 3,090,826 A | 5/1963 | Cochran |
| 3,118,363 A | 1/1964 | Burgess, Jr. |
| 3,247,558 A | 4/1966 | Kaufman |
| 3,322,381 A | 5/1967 | Bubb |
| 3,327,310 A | 6/1967 | Bethune et al. |
| 3,333,808 A | 8/1967 | Du Boff |
| 3,350,120 A | 10/1967 | Hinrichs |
| 3,431,585 A | 3/1969 | Foltz |
| 3,433,510 A | 3/1969 | Hulterstrum |
| 3,506,135 A | 4/1970 | Klingaman |
| 3,529,860 A | 9/1970 | Jelley |
| 3,592,434 A | 7/1971 | Murray |
| 3,604,397 A | 9/1971 | Salerno |
| 3,608,991 A | 9/1971 | Wade |
| 3,713,643 A | 1/1973 | Gerstenberger |
| 3,767,253 A | 10/1973 | Kluetsch |
| 3,792,510 A | 2/1974 | Evett |
| 3,822,850 A | 7/1974 | Elias |
| 3,858,988 A | 1/1975 | Cohen |
| 3,861,663 A | 1/1975 | Strickland |
| 3,863,554 A | 2/1975 | Boyd |
| 3,952,877 A | 4/1976 | Kindl |
| 3,956,784 A | 5/1976 | Vargas |
| 3,972,272 A | 8/1976 | Bagby |
| 3,994,463 A | 11/1976 | Baker |
| 4,077,083 A | 3/1978 | Siemund et al. |
| 4,078,756 A | 3/1978 | Cross |
| 4,087,006 A | 5/1978 | Schill |
| 4,111,217 A | 9/1978 | Victor |
| 4,127,911 A | 12/1978 | Cupp et al. |
| 4,139,101 A | 2/1979 | Towfigh |
| 4,277,863 A | 7/1981 | Faneuf |
| 4,334,461 A | 6/1982 | Ferguson et al. |
| 4,379,654 A | 4/1983 | Rovelli |
| 4,396,325 A | 8/1983 | Joice-Cavanagh |
| 4,488,651 A | 12/1984 | Bishop |
| 4,502,256 A | 3/1985 | Hahn |
| 4,536,924 A | 8/1985 | Willoughby |
| 4,576,354 A | 3/1986 | Blessing, Sr. |
| 4,586,844 A | 5/1986 | Hammonds et al. |
| 4,592,797 A | 6/1986 | Carlson |
| 4,645,473 A | 2/1987 | Mochizuki |
| 4,662,034 A | 5/1987 | Cunningham |
| 4,708,189 A | 11/1987 | Ward |
| 4,715,089 A | 12/1987 | Schema |
| 4,717,107 A | 1/1988 | Servadio |
| 4,770,086 A | 9/1988 | Gabster |
| 4,794,974 A | 1/1989 | Melino |
| 4,824,302 A | 4/1989 | Schultheis et al. |
| 4,852,844 A | 8/1989 | Villaveces |
| 4,874,028 A | 10/1989 | Lynch et al. |
| 4,885,876 A | 12/1989 | Henke |
| 4,907,835 A | 3/1990 | Salters |
| 4,912,814 A | 4/1990 | McKenzie |
| 4,926,522 A | 5/1990 | Wang |
| 4,928,916 A | 5/1990 | Molloy |
| 4,949,523 A | 8/1990 | Kassem |
| 4,969,241 A | 11/1990 | Griffin |
| 5,038,889 A | 8/1991 | Jankowski |
| 5,040,915 A | 8/1991 | Stuart et al. |
| 5,056,753 A | 10/1991 | Lunau et al. |
| 5,078,348 A | 1/1992 | Babitchenko |
| 5,116,012 A | 5/1992 | Offenhauer et al. |
| 5,129,774 A | 7/1992 | Balseiro et al. |
| 5,131,781 A | 7/1992 | Klein |
| 5,170,974 A | 12/1992 | Ruggiero |
| 5,240,058 A | 8/1993 | Ward |
| 5,287,614 A | 2/1994 | Ehrlich |
| 5,299,773 A | 4/1994 | Bertrand |
| 5,301,915 A | 4/1994 | Bahniuk et al. |
| 5,308,280 A | 5/1994 | Dotson |
| 5,331,706 A | 7/1994 | Graham |
| 5,345,989 A | 9/1994 | Brophy |
| 5,375,303 A | 12/1994 | Shenier |
| 5,379,491 A | 1/1995 | Solo |
| 5,384,938 A | 1/1995 | Frederick |
| 5,388,283 A | 2/1995 | Garnett |
| 5,400,959 A | 3/1995 | Cone |
| 5,404,602 A | 4/1995 | Kondo |
| 5,469,607 A | 11/1995 | Henningsson et al. |
| 5,497,537 A | 3/1996 | Robinson et al. |
| 5,524,693 A | 6/1996 | Hamilton |
| 5,529,326 A | 6/1996 | Hwang |
| 5,536,229 A | 7/1996 | Albergo |
| 5,542,209 A | 8/1996 | Sheu |
| 5,555,607 A | 9/1996 | Parveris |
| 5,558,501 A | 9/1996 | Wang et al. |
| 5,584,456 A | 12/1996 | Stephens |
| 5,640,826 A | 6/1997 | Hurilla, Jr. |
| 5,645,272 A | 7/1997 | Brennan, Sr. |
| 5,647,607 A | 7/1997 | Bolieau |
| 5,649,780 A | 7/1997 | Schall |
| 5,666,702 A | 9/1997 | Ming-Chieh |
| 5,673,741 A | 10/1997 | Cairns |
| 5,685,112 A | 11/1997 | Fara |
| 5,707,032 A | 1/1998 | Ehrlich |
| 5,715,620 A | 2/1998 | Walker |
| 5,722,691 A | 3/1998 | Patel |
| 5,803,653 A | 9/1998 | Zuffetti |
| 5,832,652 A | 11/1998 | Bartys |
| 5,884,424 A | 3/1999 | Smith |
| 5,897,085 A | 4/1999 | Cronin |
| 5,918,843 A | 7/1999 | Stammers |
| 5,924,469 A | 7/1999 | Whittemore |
| 5,937,488 A | 8/1999 | Geiger |
| 5,940,942 A | 8/1999 | Fong |
| 5,941,434 A | 8/1999 | Green |
| 5,941,586 A | 8/1999 | Fann |
| 5,944,464 A | 8/1999 | Cole, Jr. |
| 5,979,110 A | 11/1999 | Tai |
| 6,053,527 A | 4/2000 | Gans et al. |
| 6,067,691 A | 5/2000 | Feltman |
| 6,079,173 A | 6/2000 | Waalkes et al. |
| 6,082,945 A | 7/2000 | Jeffries et al. |
| 6,152,434 A | 11/2000 | Gluck |
| 6,164,605 A | 12/2000 | Drake et al. |
| 6,170,112 B1 | 1/2001 | Mayfield et al. |
| 6,209,615 B1 | 4/2001 | Whittemore |
| 6,237,182 B1 | 5/2001 | Cassar |
| 6,321,823 B1 | 11/2001 | Whittemore |
| 6,341,401 B1 | 1/2002 | Lin |
| 6,378,175 B1 | 4/2002 | Vanderpan |
| 6,467,741 B1 | 10/2002 | Shih |
| 6,474,609 B1 | 11/2002 | Pinard |
| 6,490,749 B1 | 12/2002 | Morad |
| 6,508,295 B2 | 1/2003 | Whittemore |
| 6,523,231 B1 | 2/2003 | Lassiter |
| 6,564,512 B1 | 5/2003 | Whittemore |
| 6,584,702 B2 | 7/2003 | Irey |
| 6,634,678 B2 | 10/2003 | Mariman |
| 6,662,488 B1 | 12/2003 | Heimbrock et al. |
| 6,729,358 B1 | 5/2004 | Moffatt |
| 6,908,250 B2 | 6/2005 | Moffatt |
| 6,942,004 B2 | 9/2005 | Whittemore |
| 6,953,076 B2 | 10/2005 | Whittemore |
| 7,073,758 B2 | 7/2006 | Whittemore et al. |
| 7,108,040 B2 | 9/2006 | Whittemore |
| 7,255,312 B2 | 8/2007 | Melic |
| 7,261,140 B2 | 8/2007 | Whittemore |
| 7,290,742 B2 | 11/2007 | Wang |
| 7,314,078 B2 | 1/2008 | Melino, Jr. et al. |
| 7,503,373 B2 | 3/2009 | Whittemore |

(56) References Cited

U.S. PATENT DOCUMENTS

| | | |
|---|---|---|
| 7,533,712 B2 | 5/2009 | Whittemore et al. |
| 7,658,219 B2 | 2/2010 | Whittemore |
| 7,670,401 B2 | 3/2010 | Whittemore |
| 7,717,382 B2 | 5/2010 | Whittemore et al. |
| 7,743,512 B1 | 6/2010 | Whittemore |
| 7,905,938 B2 | 3/2011 | Whittemore |
| 8,066,051 B2 | 11/2011 | Whittemore |
| 8,069,546 B1 | 12/2011 | Whittemore |
| 8,074,700 B1 | 12/2011 | Melino et al. |
| 8,113,475 B2 | 2/2012 | Whittemore et al. |
| 8,137,426 B2 | 3/2012 | Whittemore |
| 8,349,047 B2 | 1/2013 | Whittemore |
| 8,366,155 B1 | 2/2013 | Nolasco |
| 8,371,360 B2 | 2/2013 | Whittemore |
| 8,641,006 B2 | 2/2014 | Reichel |
| 8,801,824 B2 | 8/2014 | Whittemore |
| 8,857,499 B2 | 10/2014 | Whittemore |
| 9,062,468 B2 | 6/2015 | Behringer |
| 9,115,539 B2 | 8/2015 | Whittemore |
| 9,441,392 B2 | 9/2016 | Whittemore |
| 9,458,862 B2 | 10/2016 | Whittemore |
| D777,901 S | 1/2017 | Whittemore |
| 9,657,514 B1 | 5/2017 | Whittemore |
| 9,663,962 B1 | 5/2017 | Whittemore |
| 9,689,108 B2 | 6/2017 | Hamman, Jr. et al. |
| 9,784,287 B2 | 10/2017 | Whittemore |
| 10,081,955 B2 | 9/2018 | Whittemore |
| 10,174,514 B2 | 1/2019 | Whittemore |
| 10,428,539 B2 | 10/2019 | Whittemore |
| 10,538,930 B2 | 1/2020 | Whittemore |
| 10,597,882 B2 | 3/2020 | Whittemore |
| 10,689,865 B2 | 6/2020 | Whittemore |
| 10,781,597 B2 | 9/2020 | Whittemore |
| 10,961,730 B2 | 3/2021 | Whittemore |
| 10,968,649 B1 | 4/2021 | Whittemore |
| 11,230,091 B2 | 1/2022 | Whittemore |
| 11,441,323 B2 | 9/2022 | Whittemore |
| 11,447,968 B2 | 9/2022 | Whittemore |
| 2001/0000834 A1 | 5/2001 | Rey |
| 2001/0029640 A1 | 10/2001 | Cassar |
| 2002/0011316 A1 | 1/2002 | Whittemore |
| 2002/0135182 A1 | 9/2002 | Mariman |
| 2003/0028988 A1 | 2/2003 | Streutker et al. |
| 2003/0070773 A1 | 4/2003 | Whittemore |
| 2003/0154588 A1 | 8/2003 | Blacket et al. |
| 2004/0031892 A1 | 2/2004 | Whittemore et al. |
| 2004/0065799 A1 | 4/2004 | Whittemore et al. |
| 2004/0194418 A1 | 10/2004 | Gouley |
| 2004/0200585 A1 | 10/2004 | Whittemore |
| 2005/0077015 A1 | 4/2005 | Melino, Jr. et al. |
| 2005/0205729 A1 | 9/2005 | Wang |
| 2005/0247414 A1 | 11/2005 | Whittemore |
| 2005/0284591 A1 | 12/2005 | Whittemore |
| 2006/0022186 A1 | 2/2006 | Melic |
| 2006/0117679 A1 | 6/2006 | Ferony |
| 2006/0168925 A1 | 8/2006 | Whittemore |
| 2006/0272785 A1 | 12/2006 | Whittemore |
| 2007/0257170 A1 | 11/2007 | Whittemore et al. |
| 2008/0006374 A1 | 1/2008 | Whittemore |
| 2009/0071614 A1 | 3/2009 | Whittemore |
| 2009/0241688 A1 | 10/2009 | Reichel |
| 2010/0108849 A1 | 5/2010 | Whittemore |
| 2010/0115898 A1 | 5/2010 | Whittemore |
| 2010/0237209 A1 | 9/2010 | Whittemore et al. |
| 2011/0068025 A1 | 3/2011 | Whittemore |
| 2011/0126500 A1 | 6/2011 | Whittemore |
| 2011/0192522 A1 | 8/2011 | Whittemore |
| 2012/0049034 A1 | 3/2012 | Whittemore |
| 2012/0148399 A1 | 6/2012 | Whittemore |
| 2012/0234705 A1 | 9/2012 | Whittemore |
| 2013/0134279 A1 | 5/2013 | Whittemore |
| 2014/0047805 A1 | 2/2014 | Whittemore |
| 2014/0049043 A1 | 2/2014 | Hamman, Jr. et al. |
| 2014/0263916 A1 | 9/2014 | Behringer |
| 2014/0341725 A1 | 11/2014 | Whittemore |
| 2015/0052843 A1 | 2/2015 | Whittemore |
| 2016/0025110 A1 | 1/2016 | Whittemore |
| 2016/0356040 A1 | 12/2016 | Whittemore |
| 2017/0009473 A1 | 1/2017 | Whittemore |
| 2017/0009474 A1 | 1/2017 | Whittemore |
| 2017/0020322 A1 | 1/2017 | Whittemore |
| 2018/0154293 A1 | 6/2018 | Whittemore |
| 2018/0291675 A1 | 10/2018 | Whittemore |
| 2019/0003193 A1 | 1/2019 | Whittemore |
| 2019/0186162 A1 | 6/2019 | Whittemore |
| 2020/0024858 A1 | 1/2020 | Whittemore |
| 2020/0080685 A1 | 3/2020 | Whittemore |
| 2020/0087935 A1 | 3/2020 | Whittemore |
| 2020/0109599 A1 | 4/2020 | Whittemore |
| 2021/0047850 A1 | 2/2021 | Whittemore |
| 2022/0090398 A1 | 3/2022 | Whittemore |
| 2023/0067682 A1 | 3/2023 | Whittemore |
| 2023/0358061 A1 | 11/2023 | Whittemore |

FOREIGN PATENT DOCUMENTS

| | | |
|---|---|---|
| DE | 3326244 | 2/1985 |
| DE | 3918516 | 12/1990 |
| DE | 4420849 | 12/1995 |
| DE | 29605222 | 6/1996 |
| DE | 19618138 | 3/1997 |
| EP | 0190913 | 8/1986 |
| EP | 0976351 | 2/2000 |
| FR | 2411282 | 7/1979 |
| GB | 1042086 | 9/1966 |
| GB | 2156894 | 10/1985 |
| GB | 2325397 | 11/1998 |
| JP | 2001503487 | 3/2001 |
| JP | 2003206640 | 7/2003 |
| JP | 4295354 | 7/2009 |
| KR | 102105915 | 4/2020 |
| WO | 8603538 | 6/1986 |
| WO | 9109556 | 7/1991 |
| WO | 9427480 | 12/1994 |
| WO | 2004011163 | 2/2004 |
| WO | 2005110047 | 11/2005 |
| WO | 2017117042 | 7/2017 |

OTHER PUBLICATIONS

Canadian Office Action dated Dec. 19, 2023 issued in Canadian Application No. 3125230.
Extended European Search Report dated Oct. 20, 2022 issued in corresponding European Application No. 20739227.5.
Extended European Search Report dated Aug. 22, 2022 issued in corresponding European Application No. 20738465.2.
International Search Report and Written Opinion dated May 26, 2020 issued in corresponding International Application No. PCT/US20/13415.
International Preliminary Report on Patentability dated Jan. 11, 2024 issued in International Application No. PCT/US2022/035702.
International Search Report and Written Opinion dated Dec. 14, 2022 issued in International Application No. PCT/US2022/035702.
International Search Report and Written Opinion dated Apr. 29, 2020 issued in International Application No. PCT/US2020/013282.
International Preliminary Report on Patentability dated Jun. 16, 2021 issued in International Application No. PCT/US2020/013282.
International Preliminary Report on Patentability dated Jun. 16, 2021 issued in International Application No. PCT/US2022/013415.
Canadian Office Action dated Nov. 19, 2024 issued in Canadian Application No. 3125230.
Canadian Office Action dated Dec. 13, 2024 issued in Canadian Application No. 3125232.
"Curtain-Wall", Brochure by Curtain-Wall.com, Feb. 2000.
"KwikPole", Brochure by KwikPole, Inc. www.kwikpole.com/setup.html (Aug. 2003).
"Mr. Long Arm", Brochure by Mr. LongArm, Inc., 2004.
"QUICKPROP", Brochure by Protecta Screen LTD, Aug. 1996.
"Snapwall Temporary Wall Support", brochure by C&S Manufacturing Inc.

(56) References Cited

OTHER PUBLICATIONS

"Third Hand", Brochure by FastCap, LLP, 2003.0.
Mllx Co., Ltd. "Magic Wall". http://www1.mllx.co.jp/.
North American Marketing Representatives, Inc. "Power Pole". http:/www.waldmannbenches.com/power5205pole520content.htm (Nov. 2004).
Partial European Search Report dated Mar. 25, 2025 issued in European Application No. 22834210.1.

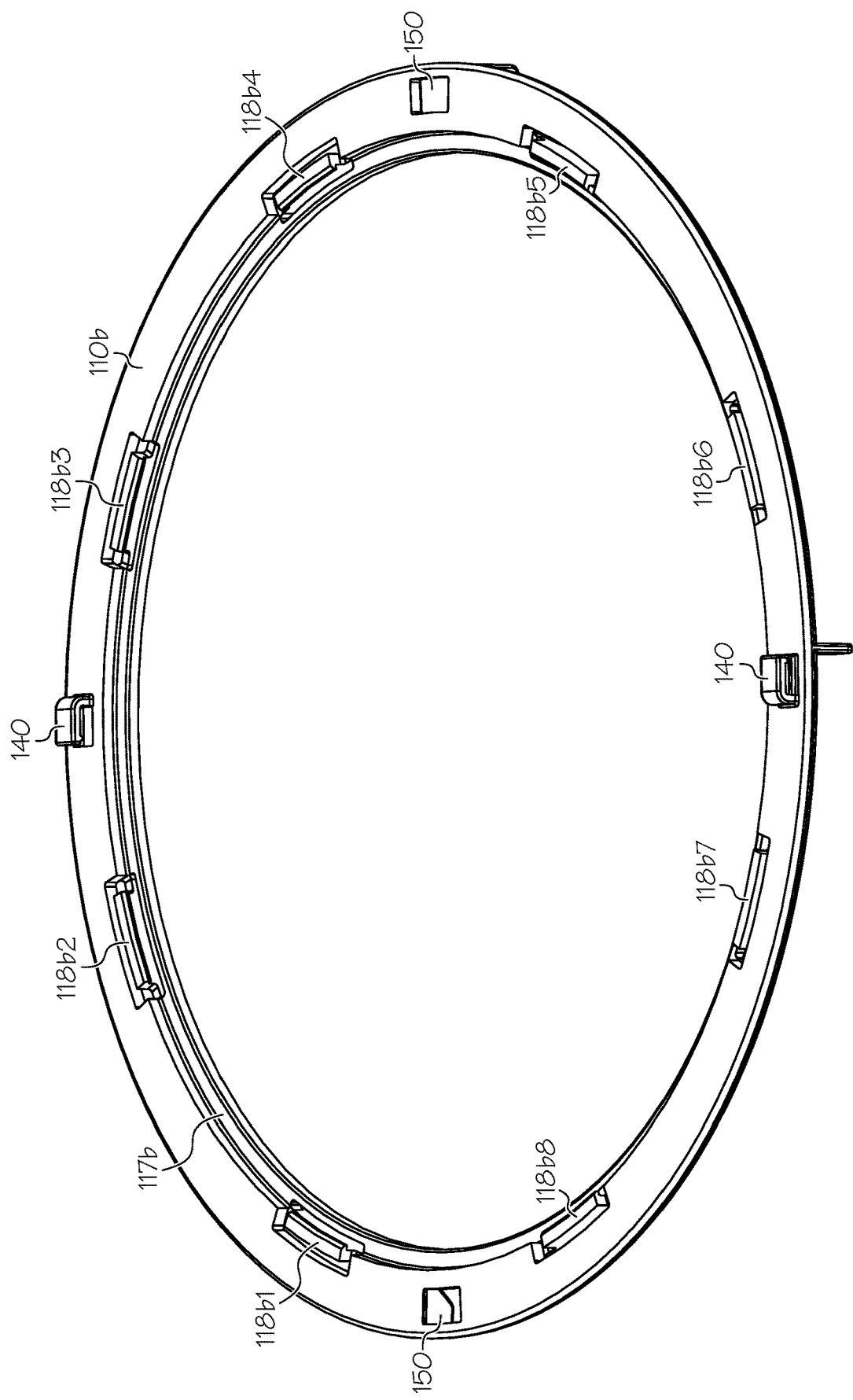

FLEXIBLE AIR DUCT SYSTEMS AND METHODS OF INSTALLATION AND USE THEREOF

RELATED APPLICATIONS

This application claims the benefit of:
U.S. Provisional Application Ser. No. 62/791,233, filed Jan. 11, 2019;
U.S. Provisional Application Ser. No. 62/931,380, filed Nov. 6, 2019;
U.S. Provisional Application Ser. No. 62/791,306, filed Jan. 11, 2019; and
U.S. Provisional Application Ser. No. 62/893,465, filed Aug. 29, 2019;
the content of each being incorporated herein by reference, in its entirety.
This application is related to:
U.S. Pat. No. 5,924,469, issued on Jul. 20, 1999;
U.S. Pat. No. 6,564,512, issued on May 20, 2003;
U.S. Pat. No. 7,073,758, issued on Jul. 11, 2006;
U.S. Pat. No. 7,533,712, issued on May 19, 2009;
U.S. Pat. No. 7,658,219, issued on Feb. 9, 2010;
U.S. Pat. No. 7,670,401, issued on Mar. 2, 2010;
U.S. Pat. No. 7,743,512, issued on Jun. 29, 2010;
U.S. Pat. No. 7,717,382, issued on May 18, 2010;
U.S. Pat. No. 9,115,539, issued on Aug. 25, 2015;
U.S. Pat. No. 9,657,514, issued on May 23, 2017;
U.S. Pat. No. 9,663,962, issued on May 30, 2017;
U.S. Pat. No. 10,081,955, issued on Sep. 25, 2018;
U.S. Pat. No. 10,174,514, issued on Jan. 8, 2019;
U.S. Pat. No. 10,428,539, issued on Oct. 1, 2019;
Patent Cooperation Treaty Application Serial Number PCT/US16/068493, filed on Dec. 23, 2016, PCT Publication No. WO 2017/117042, published Jul. 6, 2017; and
U.S. patent application Ser. No. 15/822,423, filed on Nov. 27, 2017, United States Publication No. 2018-0154293, published Jun. 7, 2018;
the content of each being incorporated herein by reference in its entirety.

BACKGROUND

Partition systems are often employed to isolate portions of a building or room, by serving as a barrier to dust, noise, light, odors, and other intrusions. In construction zones, partitions are useful for protecting a clean area from a work area, for example, protecting an area where furniture and rugs are temporarily stored from an area where wood floors are being refinished.

Workers at construction sites often use rudimentary techniques for installing partitions. Some simply nail, screw, or staple the curtain or partition material to the floor, ceiling, and abutting walls, resulting in damage to their surfaces. Other workers setting up a barrier employ tape or other adhesives which could result in paint being removed from the wall or the adhesive material being difficult to remove. The tape usually fails to stick, but, if it does stick, as the tape is removed, paint can pull off with the tape, or adhesive is left behind.

U.S. Pat. Nos. 5,924,469 and 7,658,219, incorporated herein by reference, disclose partition mount systems that address these limitations. These systems utilize a plurality of spring-biased pole mounts that secure a curtain or drape material, such as plastic, cloth, and the like, to form a temporary partition. The disclosed system is a "clean" system configured to be installed and removed without damaging or otherwise marking the ceiling, floor or walls in the construction zone. Assembly is easy and fast and can be accomplished by a single individual. In certain applications, however, a sag, or gap, may be present in the curtain along a pole next to a wall, ceiling, door frame, or other abutting surface, compromising the effectiveness of the installation.

U.S. Pat. No. 7,533,712, the content of which is incorporated herein by reference, discloses a mount system that mitigates or eliminates sag, or gaps, between an installed curtain and an abutting surface such as a wall or ceiling. The system accomplishes this in a manner that avoids permanent damage to the wall or ceiling surface. The system includes a head with an elongated body and a compressible curtain interface. A pole, for example, as described in connection with U.S. Pat. Nos. 5,924,469 and 7,658,219, may be configured to urge the head and the curtain to the abutting surface, thereby eliminating a sag, or gap in the curtain.

In certain configurations, it may be desirable to position a flexible air duct through a curtain of a partition installation to allow presentation or removal of forced air or to from a region enclosed by the partition installation. In some cases, positioning of a flexible air duct may be desired for ambient air ventilation of the region. Placement of the flexible air duct between the curtain and abutting surface can compromise the installation and/or can be unsightly.

SUMMARY

In some embodiments, the frame comprises a first frame portion and a second frame portion. The first frame portion and second frame portion are constructed and arranged to mate or couple with each other with a portion of the curtain positioned therebetween. In some embodiments, the first and second frame portions comprise locking features that lock the coupled first and second frame portions with each other.

In some embodiments, an enclosure is positioned between the housing and an outer surface of the flexible air duct. In some embodiments, the enclosure comprises a flexible fabric that is coupled to the housing at a first end. In some embodiments, a second end of the enclosure comprises a retractable member that has an adjustable inner width so that the enclosure can be sized to be tightened about a flexible air ducts of varying outer widths.

In some embodiments, the housing is supported by a neighboring curtain support. In some embodiments, the curtain support comprises an elongated pole. In some embodiments, the housing is coupled to the neighboring curtain support by an adjustable clamp.

In an aspect, a housing is mounted to a curtain. In some embodiments, the housing includes an aperture. Upon installation of the housing to the curtain, a portion of the curtain is removed in the region of the aperture. In some embodiments, a flexible air duct can be presented through the aperture. In some embodiments, the aperture can serve as a passageway, or designated portal, for passing tools, wires, or other desired items.

In some embodiments the housing comprises a frame. In some embodiments, the frame comprises a circular frame. In some embodiments, the frame comprises an oval or elliptical frame. In some embodiments, the frame comprises a square, rectangular or polygonal frame.

In an aspect, a housing frame, comprises: a first frame portion, comprising a first aperture; and a second frame portion, comprising a second aperture, the second frame portion constructed and arranged to couple with the first frame portion such that a portion of the first aperture is aligned with a portion of the second aperture.

In some embodiments, coupling of the first and second frame portions aligns a center of the first aperture with a center of the second aperture.

In some embodiments, the first frame portion is constructed and arranged to be positioned at a first side of a curtain and the second frame portion is constructed and arranged to be positioned at a second side of a curtain.

In some embodiments, the first aperture and the second aperture are constructed and arranged for an air duct to pass through them.

In some embodiments, the first frame portion and the second frame portion comprise a circular shape.

In some embodiments, the first frame portion and the second frame portion comprise a rectangular shape.

In some embodiments, the first frame portion and the second frame portion comprise a square shape.

In some embodiments, one of the first frame portion and second frame portion comprises at least one tab and wherein an other of the first frame portion and second frame portion comprises at least one slot, and wherein the at least one slot is constructed and arranged to engage the at least one tab when the first and second frame portions are mated.

In some embodiments, one of the first frame portion and second frame portion comprises at least one first magnet and wherein an other of the first frame portion and second frame portion comprises at least one second magnet, and wherein the at least one first magnet is constructed and arranged to engage the at least one second magnet when the first and second frame portions are coupled.

In some embodiments, at least one of the first frame portion and second frame portion comprises a flange comprising a seat and the frame further comprises: an enclosure having an opening constructed and arranged to be secured at the seat; and a coupling mechanism that secures the enclosure to the seat.

In some embodiments, the coupling mechanism comprises a hose clamp.

In some embodiments, the coupling mechanism comprises an elastic band.

In some embodiments, the coupling mechanism comprises a slot that captures a feature of the enclosure.

In some embodiments, the enclosure comprises a flexible fabric.

In some embodiments, one of the first frame portion and second frame portion comprises a pole clamp constructed and arranged to secure the one of the first frame portion and second frame portion of the housing frame to a side portion of a support pole.

In some embodiments, the first and second frame portions, when coupled, provide a space region between them sufficient for accommodating a portion of a curtain.

In an aspect, a system comprises: a housing frame, comprising: a first frame portion, comprising a first aperture; and a second frame portion, comprising a second aperture, the second frame portion constructed and arranged to couple with the first frame portion such that a portion of the first aperture is aligned with the a portion of the second aperture; and an enclosure, comprising: a first end coupled to the housing frame; and a second end comprising a retractable member, the retractable member comprising an adjustable inner width.

In some embodiments, the enclosure comprises a flexible fabric.

In an aspect, a system comprises: a housing frame, comprising a first frame portion, comprising a first aperture; and a second frame portion, comprising a second aperture, the second frame portion constructed and arranged to couple with the first frame portion such that a portion of the first aperture is aligned with the a portion of the second aperture; and an adjustable clamp, comprising: a first frame portion coupled to the housing frame; and a second frame portion constructed and arranged to be coupled to a curtain support.

In some embodiments, the curtain support comprises an elongated pole.

In an aspect, a duct coupler comprises: a base extending in a first plane and oriented about a first axis; an attachment mechanism coupled to the base; and an inner frame coupled to the base, the inner frame extending in a direction of the first axis and oriented about the first axis.

In some embodiments, the base comprises an outer edge and an inner edge.

In some embodiments, the outer edge is a circle.

In some embodiments, the inner edge is a circle.

In some embodiments, the attachment mechanism comprises one or more magnets.

In some embodiments, the attachment mechanism comprises a male connector and a female connector.

In some embodiments, the male connector is a claw.

In some embodiments, the female connector is a cavity.

In some embodiments, the male connector is a pin.

In some embodiments, the female connector is a slot.

In some embodiments, the attachment mechanism is constructed and arranged to couple with a second duct coupler.

In some embodiments, the inner frame is coupled to the base at the inner edge.

In some embodiments, the second plane is orthogonal to the first plane.

In some embodiments, the inner frame is rotatably coupled to the base.

In an aspect, a system comprises a first duct coupler and a second duct coupler. The first duct coupler comprises a first base extending in a first plane and oriented about a first axis; a first attachment mechanism coupled to the first base; and a first inner frame coupled to the first base, the first inner frame extending in a direction of the first axis and oriented about the first axis. The second duct coupler, comprises a second base extending in a first plane and oriented about a first axis; a second attachment mechanism coupled to the second base; and a second inner frame coupled to the second base, the second inner extending in a direction of the first axis and oriented about the first axis. A duct is coupled to the first duct coupler. The first duct coupler is coupled to the second duct coupler.

In some embodiments, the first duct coupler is positioned beyond the distal end of the duct.

In some embodiments, the duct is coupled to the first inner frame of the first duct coupler.

In some embodiments, the attachment mechanism comprises a male connector and a female connector.

In some embodiments, the male connector is a claw.

In some embodiments, the female connector is a cavity.

In some embodiments, the male connector is a pin.

In some embodiments, the female connector is a slot.

In some embodiments, a male connector at the first duct coupler couples with a female connector at the second duct coupler.

In some embodiments, the first attachment mechanism comprises a claw and the second attachment mechanism comprises a cavity, wherein the claw is positioned in the cavity and the first duct coupler is rotated about the first axis relative to the second duct coupler such that the claw of the first duct coupler extends over at least a portion of the base of the second duct coupler.

In an aspect, a system, comprises a filter and a portable mount. The portable mount comprises a first end coupled to the filter; a second end constructed and arranged to couple with a duct; and a channel extending from the first end to the second end and centered along a mount axis.

In some embodiments, the first end comprises an attachment mechanism constructed and arranged to couple the filter to the first end.

In some embodiments, the attachment mechanism comprises one or more filter clamps.

In some embodiments, the portable mount comprises a first portion and a second portion.

In some embodiments, a width of the channel at the first end is different than a width of the channel at the second end.

In some embodiments, a width of the channel at the first portion is different than a width of the channel at the second portion.

In some embodiments, a width of the channel at the first portion varies along the mount axis.

In an aspect, an air duct system comprises: a flexible air duct having a first end and a second end; a first duct coupler including a mounting frame and a coupling frame, the mounting frame coupled to the first end of the flexible air duct, the coupling frame rotatable relative to the mounting frame; a second duct coupler including a mounting frame and a coupling frame, the mounting frame coupled to the second end of the flexible air duct, the coupling frame rotatable relative to the mounting frame. The first and second duct couplers are of a same coupling configuration.

In some embodiments, the first and second duct couplers are of a same coupling configuration so they can be coupled to each other.

In some embodiments, the coupling frame is rotatable relative the mounting frame about a central axis of the mounting frame.

In some embodiments, the mounting frame is cylindrical.

In some embodiments, the mounting frame is constructed and arranged to receive the end of the flexible air duct.

In some embodiments, the coupling frame includes at least one claw constructed and arranged to capture at least one cavity of a mating coupling frame and at least one cavity constructed and arranged to receive a corresponding at least one claw of the mating coupling frame.

In some embodiments, the coupling frame comprises two claws and two cavities.

In some embodiments, the coupling frame comprises three claws and three cavities.

In some embodiments, the coupling frame comprises four claws and four cavities.

In some embodiments, during coupling of the coupling frame and mating coupling frame, all of the at least one claws and at least one cavities are simultaneously engaged.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

FIG. 22B is a perspective view of a base 110b of the second duct coupler of FIG. 21, in accordance with aspects of inventive concepts herein.

DETAILED DESCRIPTION OF EMBODIMENTS

Figure 1:
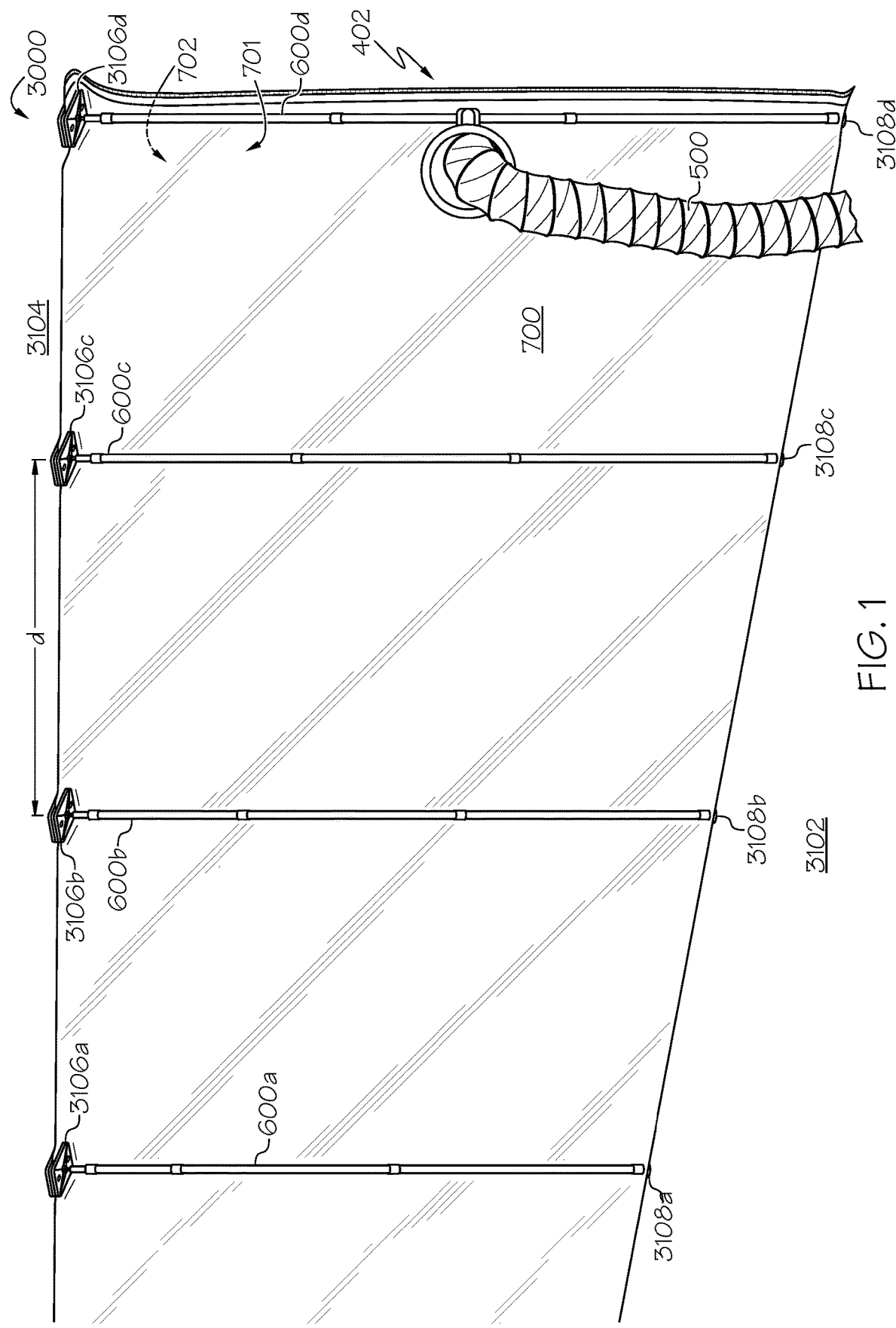
FIG. 1 is a perspective view of an embodiment of a curtain installation and a flexible air duct, in accordance with aspects of inventive concepts herein.

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. A first element may be said to be "transverse" to a second element if the first element has a direction of extension that is not parallel to the direction of extension of the second element.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in such shapes.

FIG. 1 is a perspective view of an embodiment of a dust partition system 3000, a housing frame 402, and a flexible air duct 500, in accordance with aspects of inventive concepts herein. In some embodiments, a dust partition system 3000 includes a plurality of vertical curtain support poles 600a-d installed between a floor 3102 and ceiling 3104 of a room of a building. The vertical curtain support poles 600 each include a head 3106 at a top end and a foot 3108 at a bottom end and are length-adjustable over a range of lengths. A twist-locking mechanism may be included in the support poles 600 for adjusting and fixing the respective lengths poles 600. In some embodiments, the heads 3106 each include a curtain attachment mechanism, for example in the form of a clip for securing a partition curtain 700 to top ends of the vertical poles 600. The partition curtain 700 is raised to the ceiling at each vertical pole 600 and the vertical pole 600 is adjusted in length between the floor and the ceiling. In some embodiments, the heads 3106 of the vertical poles are spring-biased in an outward longitudinal direction relative to the feet 3108 with a biasing mechanism, such as a spring mechanism, so that the vertical poles can be held in place by vertical compression applied to the vertical pole 600 between the floor 3102 and ceiling 3104. By applying a top portion of the partition curtain 700 to the heads 3106 of the vertical poles 600 and by tucking a bottom portion of the partition curtain 700 beneath the feet 3108 of the vertical poles, the partition curtain 700 can in turn be tensioned in position between the floor 3102 and ceiling 3104. In the embodiment shown in FIG. 1, the dust partition system comprises four vertical poles 600a-d. In alternative embodiments, the dust partition system comprises a different number of vertical poles.

In the embodiment shown in FIG. 1, it is desired to pass the air duct 500 through the curtain 700 to allow for controlled air movement between first air region 701 and second air region 702, at opposite sides of the curtain 700. In this embodiment, the air duct 500 passes through a housing frame 402. In this embodiment, the housing frame is coupled to a vertical pole 600d.

Figure 2:
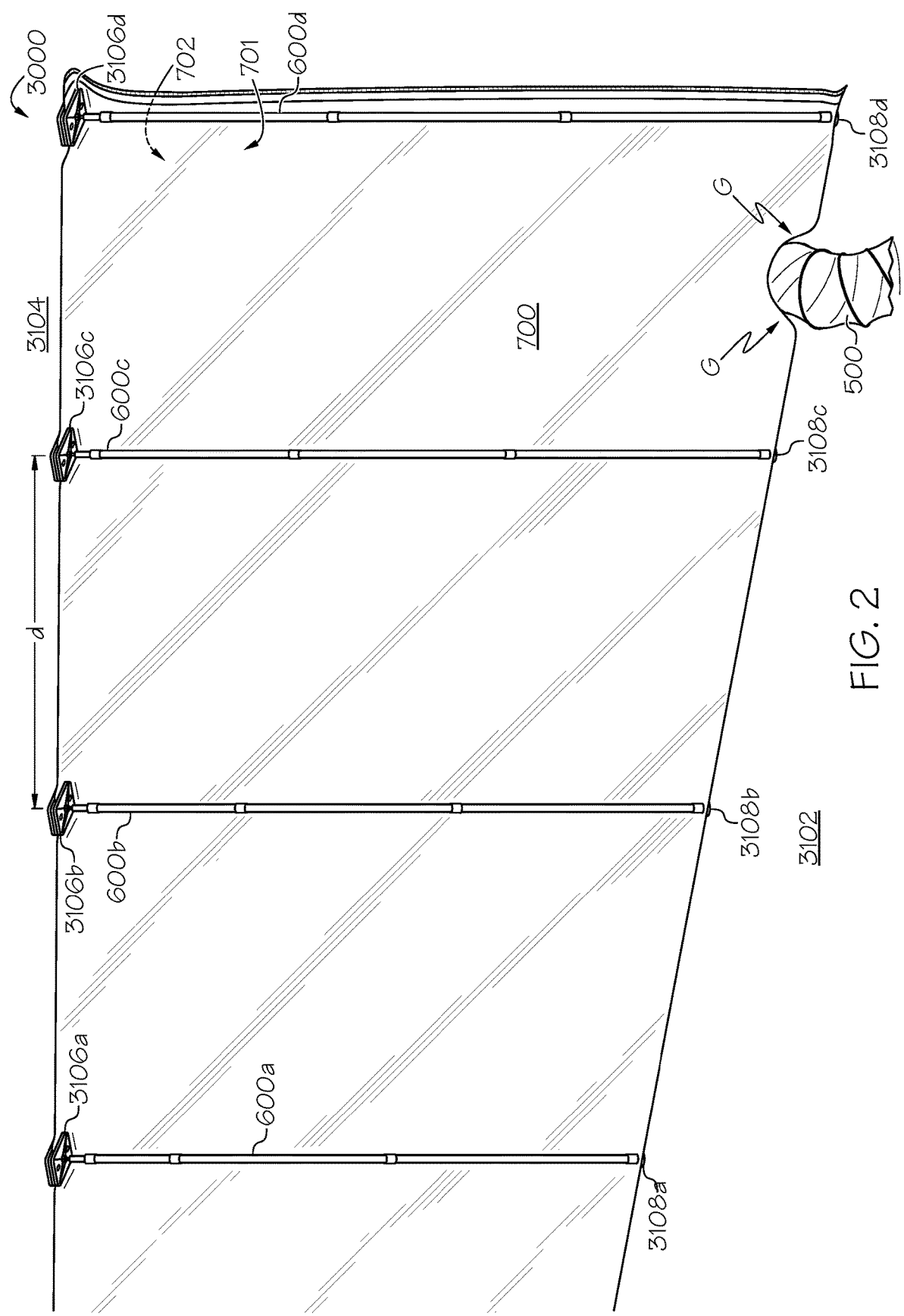
FIG. 2 is a perspective view of a curtain installation illustrating a limitation associated with conventional approaches for installation of a flexible air duct through the installation.

FIG. 2 is a perspective view of a curtain installation illustrating a limitation associated with conventional approaches for installation of a flexible air duct through the installation. It can be seen that placement of the flexible air duct 500 between the curtain 700 and the abutting surface 702, in this case, the floor 3102, can compromise the installation and/or can be unsightly. In particular, physical gaps G can be present in the regions between the air duct 500 and the curtain 700 and floor. Such gaps G can operate as an inadvertent passageway for unwanted dust and contaminants to flow between the first and second air regions 701, 702.

Figure 3:
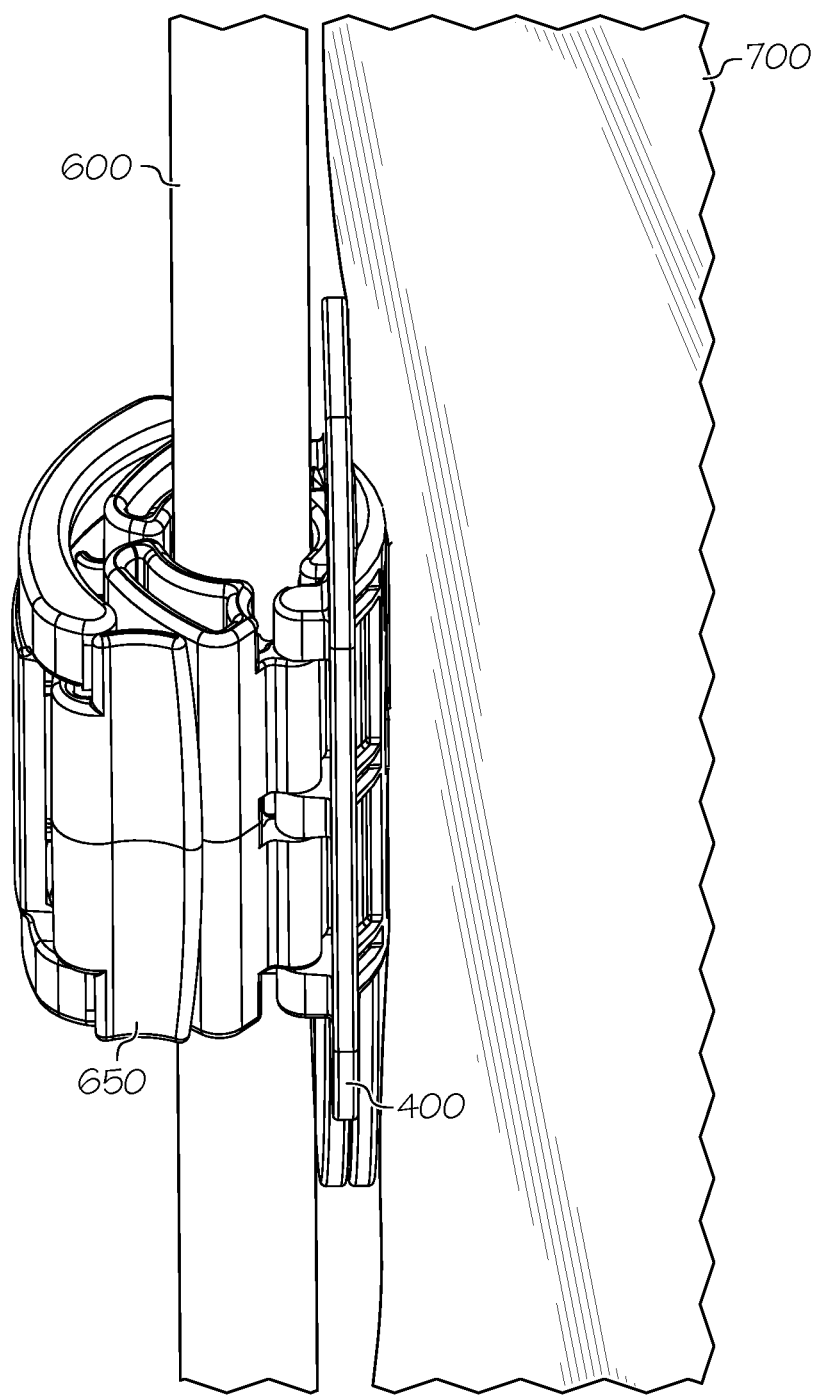
FIG. 3 is a side view of an embodiment of a first frame portion of a housing frame mounted to a first surface of a curtain, in accordance with aspects of inventive concepts herein.
Figure 4:
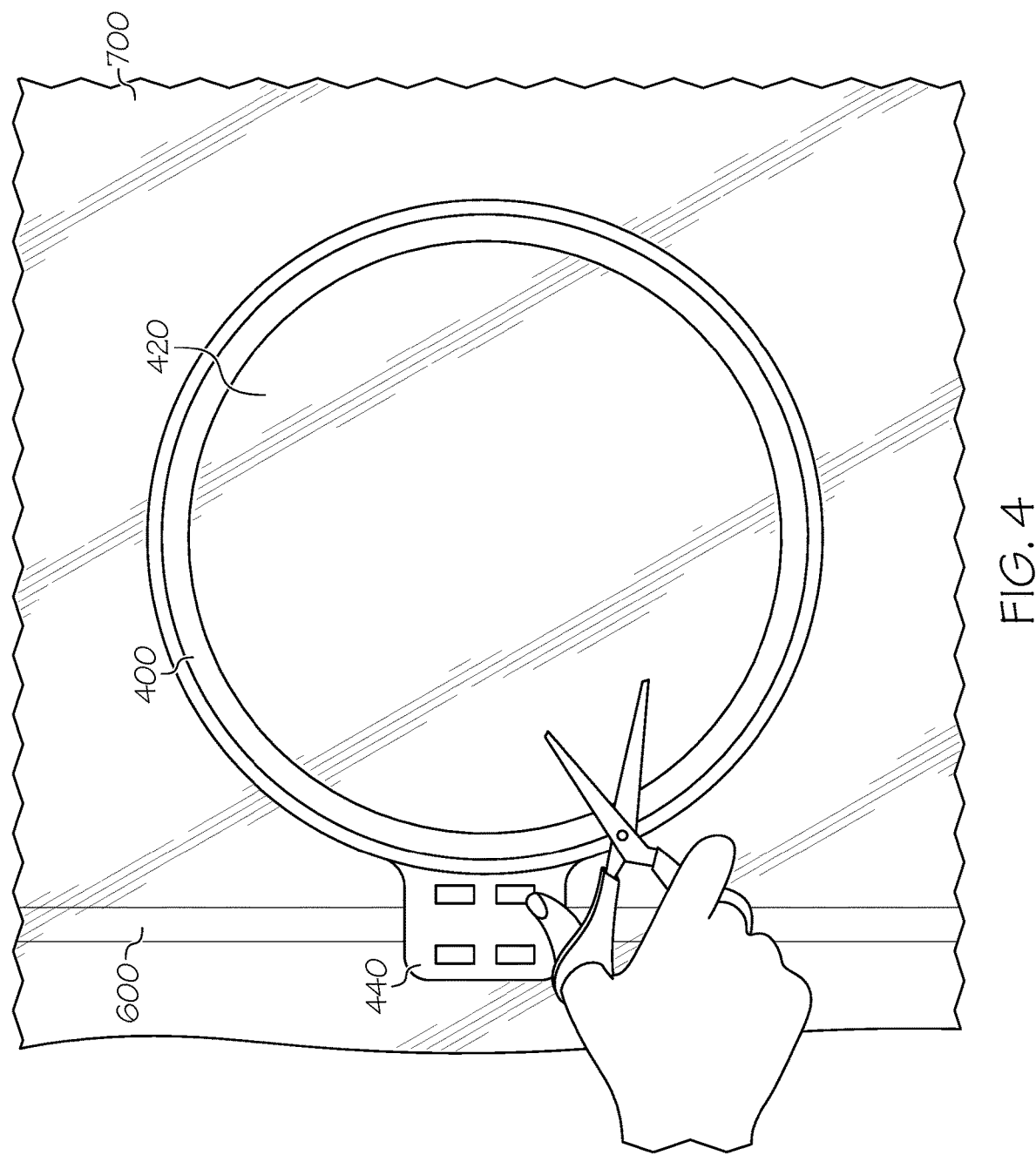
FIGS. 4 and 5A are front views of removal of a portion of the curtain in the region of an embodiment of the aperture of the frame, in accordance with aspects of inventive concepts herein.

FIG. 3 is a side view and FIG. 4 is a front view of an embodiment of a first frame portion 400 of a housing frame 402 positioned at a first surface of a curtain, in accordance with aspects of inventive concepts herein. A first frame portion 400 of the housing frame 402 is positioned at a first surface of the curtain 700 in a region neighboring a curtain support pole 600. In some embodiments, the curtain support pole 600 comprises a pole as described in U.S. Pat. No. 7,658,219, incorporated herein by reference. In some embodiments, the first frame portion 400 of the housing frame 402 is coupled to the neighboring curtain support pole 600 by a clamp 650. In some embodiments, the clamp 650 is adjustable to allow for coupling to poles 600 of different outer widths.

Figure 5A:
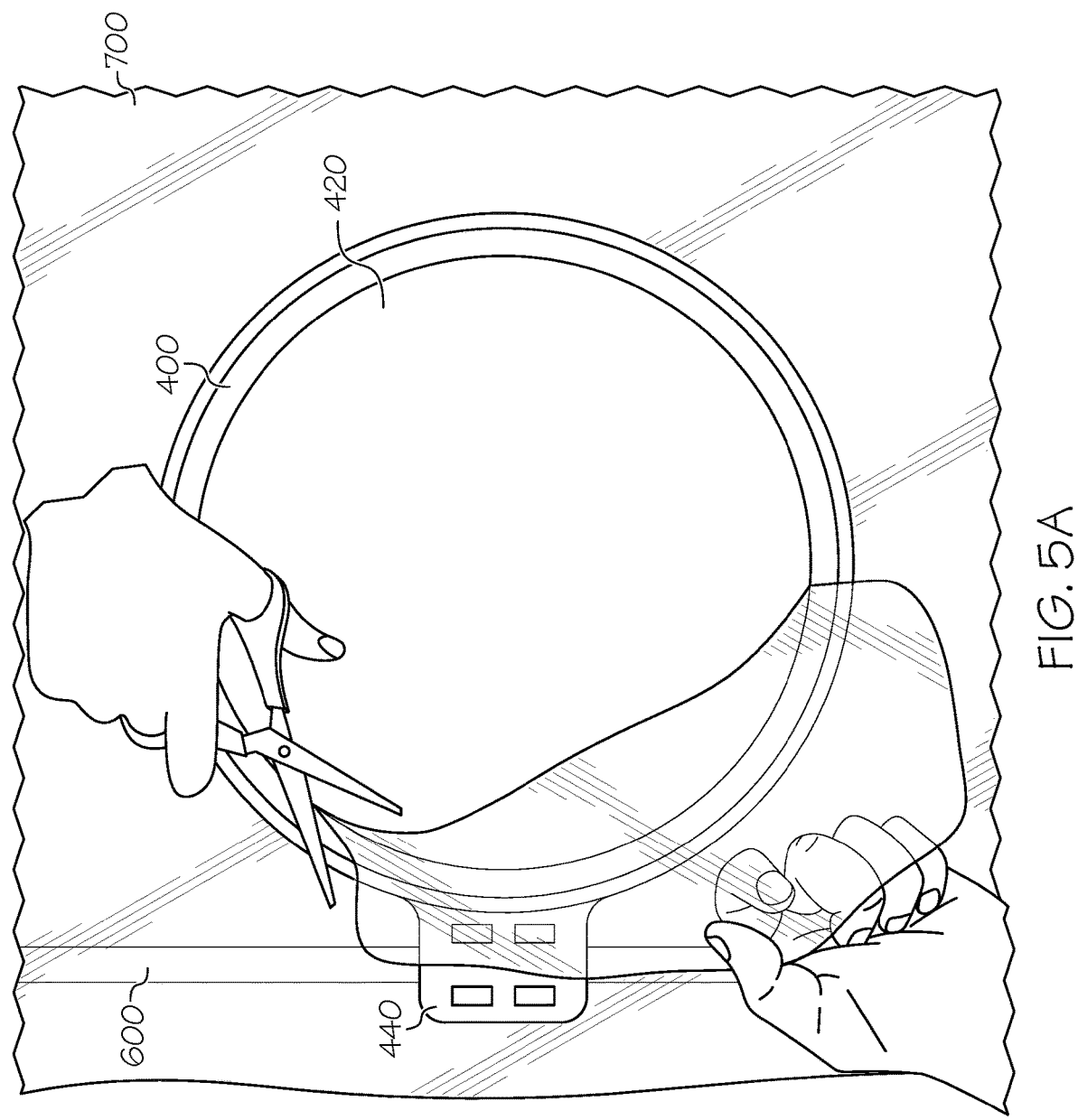

FIGS. 4 and 5A are front views of removal of a portion of the curtain 700 in the region of an embodiment of a first aperture 420 of the first frame portion 400 of the housing frame 402, in accordance with aspects of inventive concepts herein. In the embodiment shown in FIG. 4, the first frame portion 400 comprises one aperture 420. In alternative embodiments, the first frame portion 400 comprises more than one aperture.

In the embodiment shown in FIG. 4, the first aperture 420 of the first frame portion 400 comprises a circular shape. In alternative embodiments, the first aperture 420 of the first frame portion 400 comprises a different shape, for example, a rectangle, a triangle, or any such polygon. In alternative embodiments, the first aperture 420 of the first frame portion 400 comprises a different shape, for example, an oval, an elliptical, or other curved geometry. In alternative embodiments with more than one aperture, different apertures are all the same shape. In alternative embodiments with more than one aperture, one or more of the apertures are different shapes. A blade or scissors can be used to manually remove the portion of the curtain 700 in the region of the aperture 420.

In some embodiments, the first frame portion 400 comprises at least one extension 440. In some embodiments, the clamp 650 couples to the first frame portion 400 at one of the at least one extensions 440.

Figure 5B:
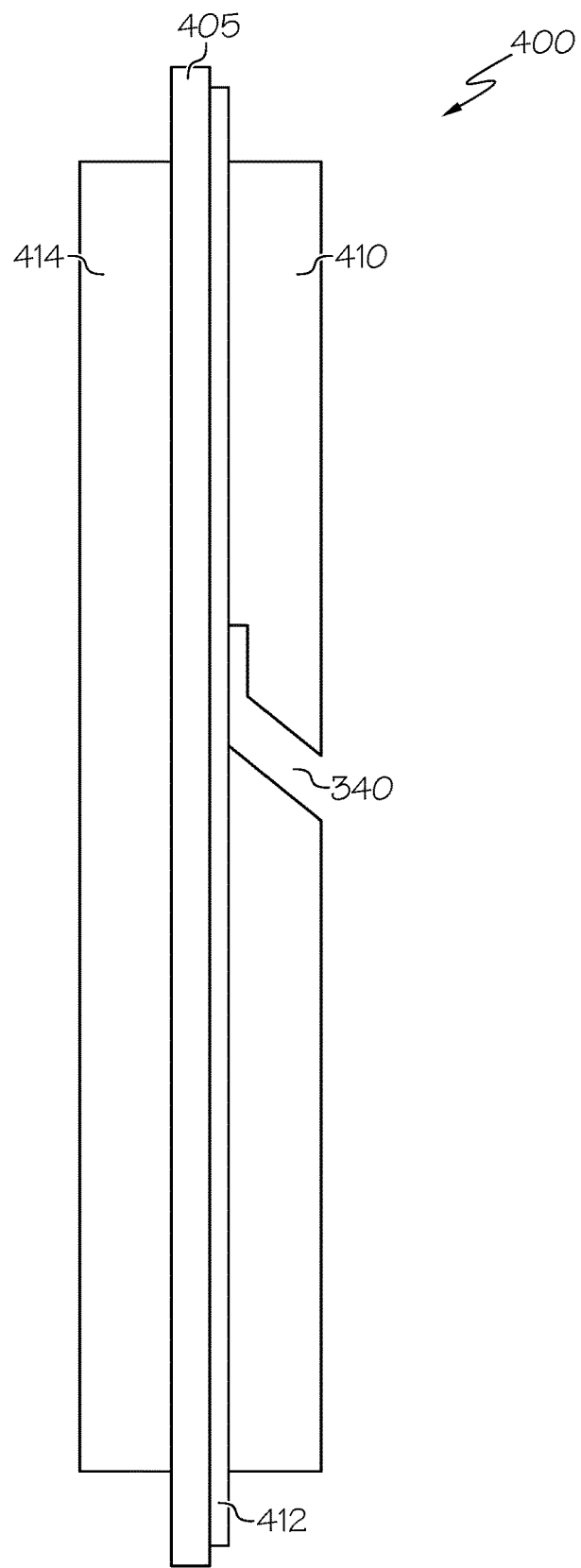
FIG. 5B is a side view of an embodiment of a first frame portion of a housing frame, in accordance with aspects of inventive concepts herein.

FIG. 5B is a side view of an embodiment of a first frame portion 400 of a housing frame 402, in accordance with aspects of inventive concepts herein. In some embodiments, such as the embodiment shown in FIG. 5B, the first frame portion 400 comprises a base 405 and at least one flange. In the embodiment shown in FIG. 5B, the first frame portion 400 comprises at least one internal flange 410. In some embodiments, one of the at least one internal flange 410 comprises inner dimensions that matches the inner dimensions of the first aperture 420. In some embodiments, the at least one internal flange 410 extends in a direction transverse to the base 405. In some embodiments, the at least one internal flange 410 is oriented such that extends towards the curtain 700 when the housing frame 402 is mounted.

In some embodiments, such as the one shown in FIG. 5B, the at least one internal flange 410 comprises at least one slot 340. In some embodiments, the at least one slot 340 is constructed and arranged to mate with a corresponding tab 320 on a second frame portion 450 of the housing frame 402.

In some embodiments, such as the one shown in FIG. 5B, the first frame portion 400 comprises at least one mating flange 412. In some embodiments, the at least one mating flange 412 extends in a direction transverse to the base 405. In some embodiments, the at least one mating flange 412 is oriented such that extends towards the curtain 700 when the housing frame 402 is mounted. In some embodiments, the at least one mating flange 412 is constructed and arranged to mate with a corresponding groove on a second frame portion 450 of the housing frame 402.

In some embodiments, such as the one shown in FIG. 5B, the first frame portion 400 comprises at least one external flange 414. In some embodiments, one of the at least one external flange 414 comprises inner dimensions that matches the inner dimensions of the first aperture 420. In some embodiments, the at least one external flange 414 extends in a direction transverse to the base 405. In some embodiments, the at least one external flange 414 is oriented such that extends away the curtain 700 when the housing frame 402 is mounted.

Figure 6:
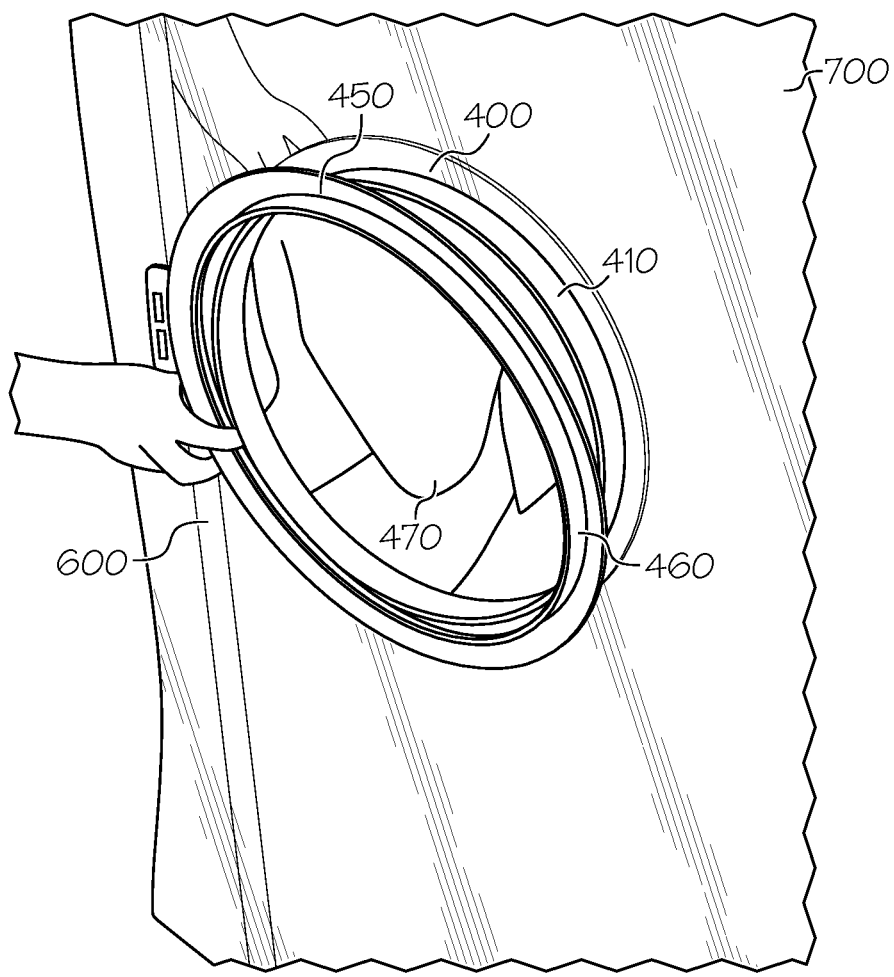
FIG. 6 is a perspective view of a mounting of an embodiment of a second frame portion of the housing frame to a second surface of the curtain, in accordance with aspects of inventive concepts herein.

FIG. 6 is a perspective view of an embodiment of a mounting of a second frame portion 450 of the housing frame 402 to a second surface of the curtain 700, in accordance with aspects of inventive concepts herein. In the present example, the second frame portion 450 comprises a second aperture 470. In the embodiment shown in FIG. 6, the second frame portion 450 comprises one aperture 470. In alternative embodiments, the second frame portion 450 comprises more than one aperture.

In this embodiment, the second aperture 470 is circular. In alternative embodiments, the second aperture 470 of the second frame portion 450 comprises a different shape, for example, a rectangle, a triangle, or any such polygon. In alternative embodiments, the second aperture 470 of the second frame portion 450 comprises a different shape, for example, an oval, an elliptical, or other curved geometry. In alternative embodiments with more than one aperture, different apertures are all the same shape. In alternative embodiments with more than one aperture, one or more of the apertures are different shapes.

In the embodiments shown in FIGS. 4-6, the first frame portion 400 and the second frame portion 450 are circular. In alternative embodiments, the first frame portion 400 comprises a different shape, for example, a rectangle, a triangle, or any such polygon. In alternative embodiments, the first frame portion 400 comprises a different shape, for example, an oval, an elliptical, or other curved geometry. In alternative embodiments, the second frame portion 450 comprises a different shape, for example, a rectangle, a triangle, or any such polygon. In alternative embodiments, the first frame portion 400 comprises a different shape, for example, an oval, an elliptical, or other curved geometry. In some embodiments, the first and second frame portions 400, 450, and their corresponding apertures 420, 470, respectively, are similar in shape so that when places adjacent each other, their apertures 420, 470 are aligned and correspond with each other. In embodiments, in which the housing frame comprises a circular shape, the housing frame may also be referred to as a ring frame.

In some embodiments, such as the one shown in FIG. 6, the second frame portion 450 of the housing frame 402 comprises at least one external flange 460. In some embodiments, the at least one external flange 460 comprises inner dimensions that matches the dimensions of the second aperture 470. In some embodiments, the inner dimensions of the at least one external flange 460 corresponds to the outer dimensions of the at least one internal flange 410 of the first frame portion 400 such that the second frame portion 450 is constructed and arranged to mate with the first frame portion 400. As a result, in some embodiments, the area of the second aperture 470 is greater than the area of the first aperture 420. In some embodiments, the curtain 700 is positioned between the flanges 410, 460 of the first frame portion 400 and second frame portion 450 of the housing frame 402. The first frame portion 400 and second frame portion 450 of the ring frame 402 are seated or nested with each other, thereby securing the curtain 700 between them. As a result, the housing frame 402 is partially supported by virtue of its attachment to the curtain 700, and partially supported by the clamp 650 coupled to the pole 600. In some embodiments, the housing frame 402 does not include the pole clamp 650, and is supported entirely by the curtain 700, once installed.

In some embodiments, the second frame portion 450 of the housing frame 402 includes the clamp 650 for coupling the frame 402 to a neighboring curtain support pole 600. In such an embodiment, the first frame portion 400 may be absent the clamp 650, or, alternatively, the first frame portion 400 may also include a clamp 650.

Figure 7:
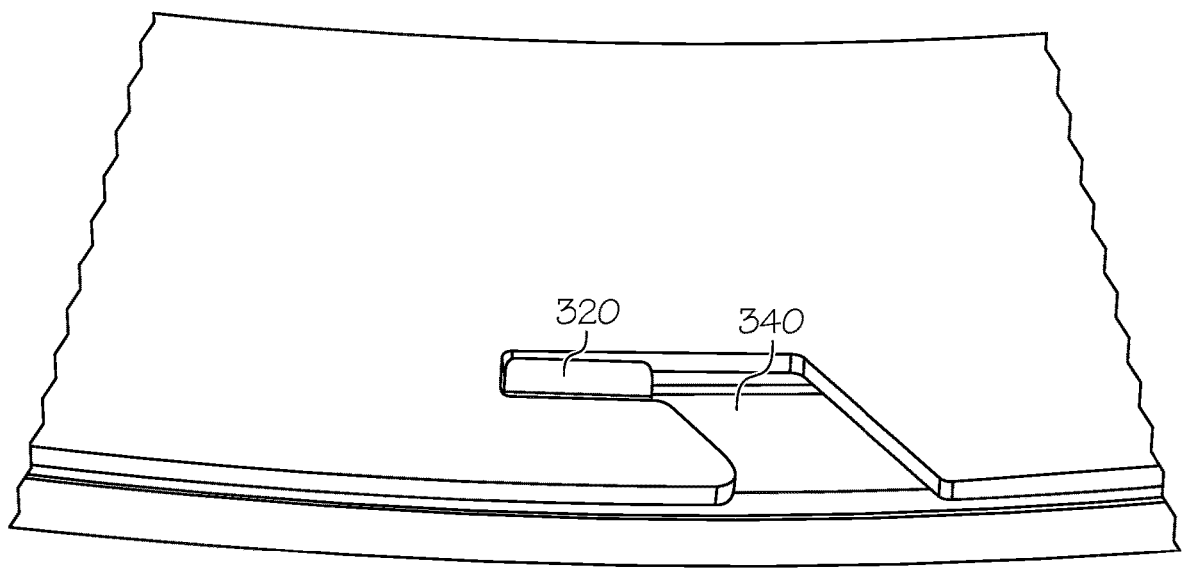
FIG. 7 is a perspective views of an embodiment of locking features operative to the first and second frame portions to each other, in accordance with aspects of inventive concepts herein.

FIG. 7 is a perspective view of an embodiment of locking features operative to the first and second housing portions 400, 450 to enable securing of the portions 400, 450 to each other, in accordance with aspects of inventive concepts herein. The locking features comprise at least one tab 320 on one of the first and second frame portions and a mating slot 340 on the other of the first and second frame portions. In the present embodiment the first and second housing portions 400, 450 are circular and the mating tab 320 and slot 340 are angled so that a twisting motion of the second frame portion 450 relative to the first frame portion seats the tab 320 within the slot 340 to place it in a locked position. Two, three, four, or more, pairs of tabs and locks may be provided about the first and second frame portions for increased registration of the locks and tabs of the first and second frame portions 400, 450.

Figure 8:
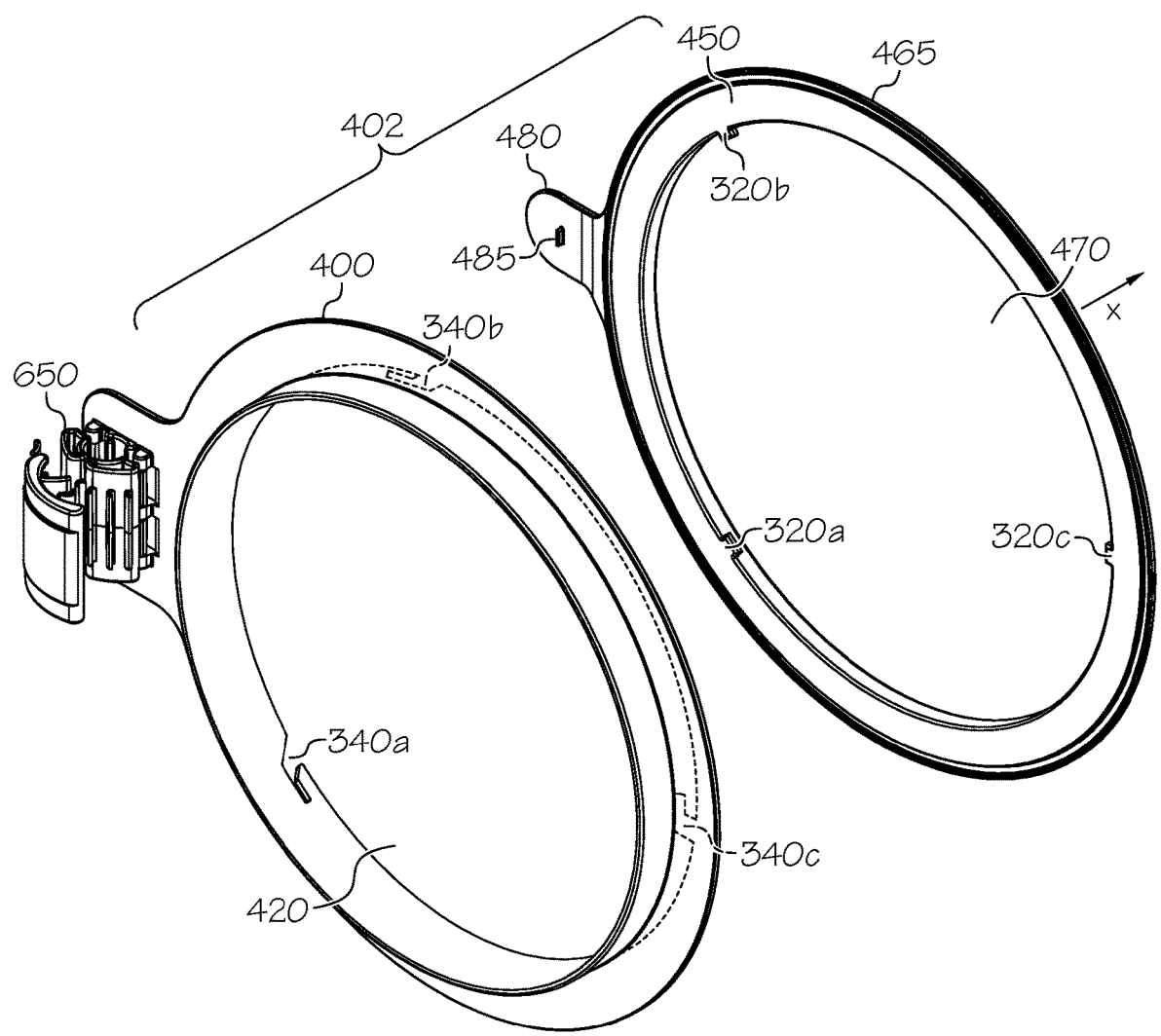
FIG. 8 is an exploded perspective view of an embodiment of the first and second frame portions of the housing frame, in accordance with aspects of inventive concepts herein.

FIG. 8 is an exploded view of an embodiment of a first frame portion 400 and a second frame portion 450 of a housing frame 402, in accordance with aspects of inventive concepts herein. In this view three tabs 320*a-c* are shown at the second frame portion 450. When the first frame portion 400 is coupled to the second frame portion 450, the first tab 320*a* is inserted into the slot 340*a*, the slot 340*a* being provided at a first edge of the internal flange 410 of the first frame portion 400. In this perspective view the slots corresponding to the second tab 320*b* and the third tab 320*c* are shown with dashed lines.

In some embodiments, such as the one shown in FIG. 8, the second frame portion 450 comprises at least one extension 480. In some embodiments, the extension 480 of the second frame portion 450 is constructed and arranged to align with the extension 440 of the first frame portion 400. In some embodiments, the extension 480 of the second frame portion 450 comprises one or more protrusions 485. In some embodiments, the extension 440 of the first frame portion 400 comprises one or more cavities (not shown), each constructed and arranged to removeable couple with the one or more protrusions 485.

In some embodiments, the second frame portion 450 comprises at least one groove 465. In some embodiments, the at least one groove 465 is constructed and arranged to couple with the at least one mating flange 412 of the first frame portion 400.

In some embodiments, such as the embodiment shown in FIG. 8, the tabs 320 are arranged such that when the first frame portion 400 is coupled to the second frame portion 450, the extension 440 of the first frame portion 400 is aligned with the extension 480 of the second frame portion 450. In different embodiments, the tabs 320 are be arranged at different positions along the edge of the second aperture 470.

In some embodiments, in order to ensure alignment, the tabs 320 are not all be separated by 120 degrees because, if they were, that would allow the first frame portion 400 to couple to the second frame portion 450 even when the extension 440 of the first frame portion 400 is not aligned with the extension 480 of the second frame portion 450. In alternative embodiments, the tabs 320 are all separated by 120 degrees or at other regular intervals.

In some embodiments, it may be desirable include fewer than three tabs 320 and matching slots 340 or greater than three tabs 320 and matching slots 340.

In some embodiments, when the first frame portion 400 is coupled to the second frame portion 450 the external flange 460 of the second frame portion 450 fits about the internal flange 410 of the first frame portion 400. In some embodiments, when the first frame portion 400 is coupled to the second frame portion 450 the outermost edge of the internal flange 410 of the first frame portion 400 in the x direction is aligned with the outermost edge of the external flange 460 of the second frame portion.

Figure 9:
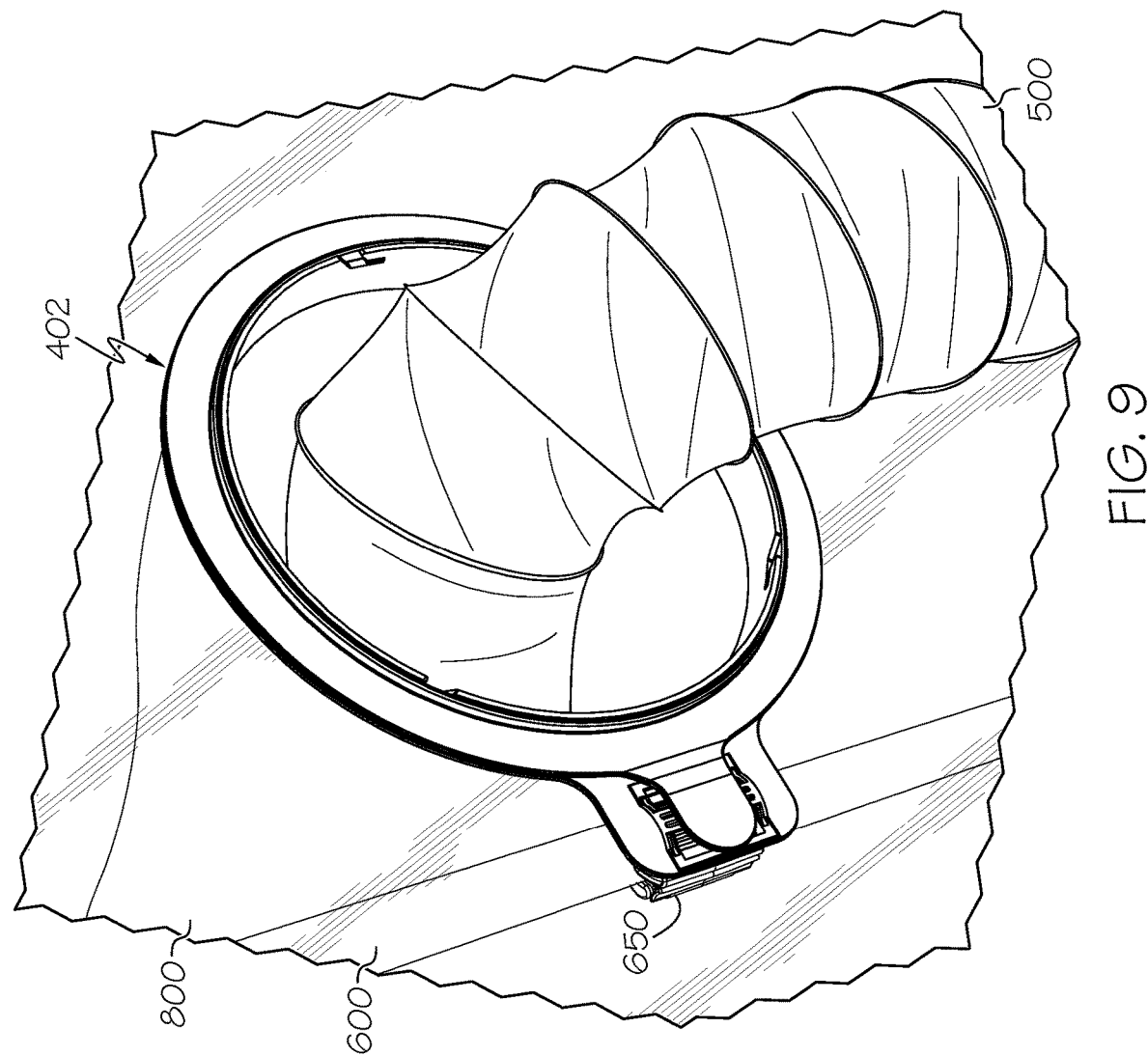
FIG. 9 is a perspective view of presentation of a flexible air duct through an embodiment of the aperture region of the frame, in accordance with aspects of inventive concepts herein.

FIG. 9 is a perspective view of an embodiment of a flexible air duct 500 through the first and second apertures of the housing frame 402, in accordance with aspects of inventive concepts herein. It can be seen in this figure that the flexible air duct 500 passes through the housing frame 402 and through an enclosure 800 attached to the first frame portion 400 of the frame 402. In some embodiments the enclosure 800 comprises a flexible fabric. In some embodiments, a first end of the enclosure 800 is coupled to the housing frame 402. In some embodiments, the first end of the enclosure 800 is coupled to the external flange 414 of the first frame portion 400. In some embodiments, a second end of the enclosure 800 comprises a retractable member 850 (see FIG. 10) that has an adjustable inner width so that the enclosure 800 can be sized to be tightened so as to accommodate flexible air ducts of different outer widths. In this manner the housing frame 402 and enclosure 800 can be adaptable to any of a number of different desired configurations.

Figure 10:
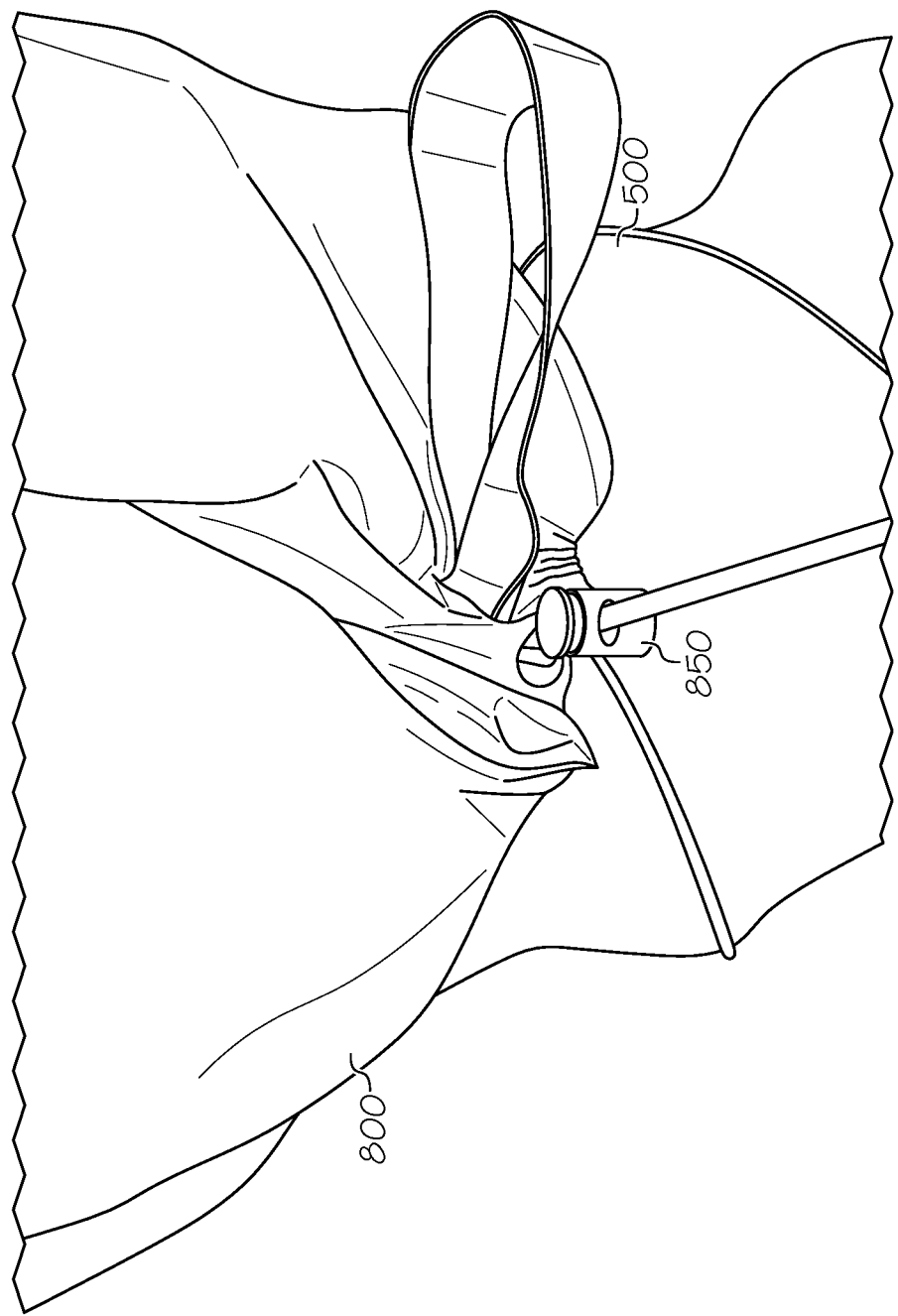
FIG. 10 is a perspective view of tightening of an embodiment of an enclosure about an outer surface of the body of the flexible air duct, in accordance with aspects of inventive concepts herein.

FIG. 10 is a perspective view of an embodiment of an enclosure 800 illustrating the tightening of a distal end 802B of the enclosure about an outer surface of the body of the flexible air duct 500 using the retractable member 850, in accordance with aspects of inventive concepts herein. In the present embodiment, the retractable member 850 comprises a draw string positioned in an elongated pocket of the enclosure 800. A spring-loaded tab locks the length of the string once adjusted for size.

Figure 11:
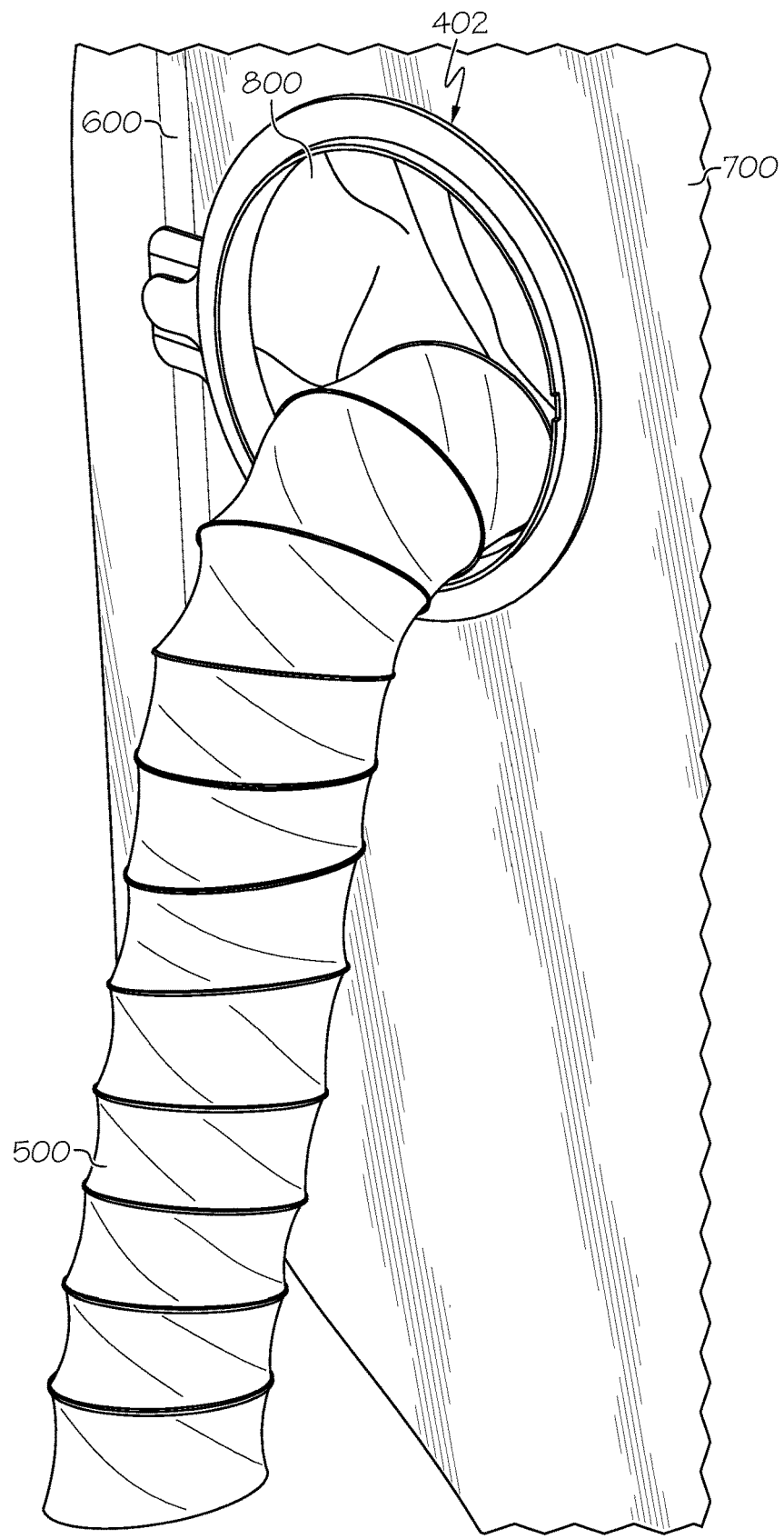
FIGS. 11-13 are perspective views of embodiments of a resulting installation of the flexible air duct, in accordance with aspects of inventive concepts herein.

FIG. 11 is a perspective view of a resulting installation of the flexible air duct 500, in accordance with aspects of inventive concepts herein. In this figure, it can be seen that the configuration provides a mechanism for passage of the air duct 500 through the body of the curtain 700. Accordingly, there is no need to interfere with the positioning of the curtain 700 along a neighboring surface. As a result, the curtain installation is not compromised as a result of the presence of the flexible air duct 500. The resulting installation is also organized and attractive in appearance.

Figure 12:
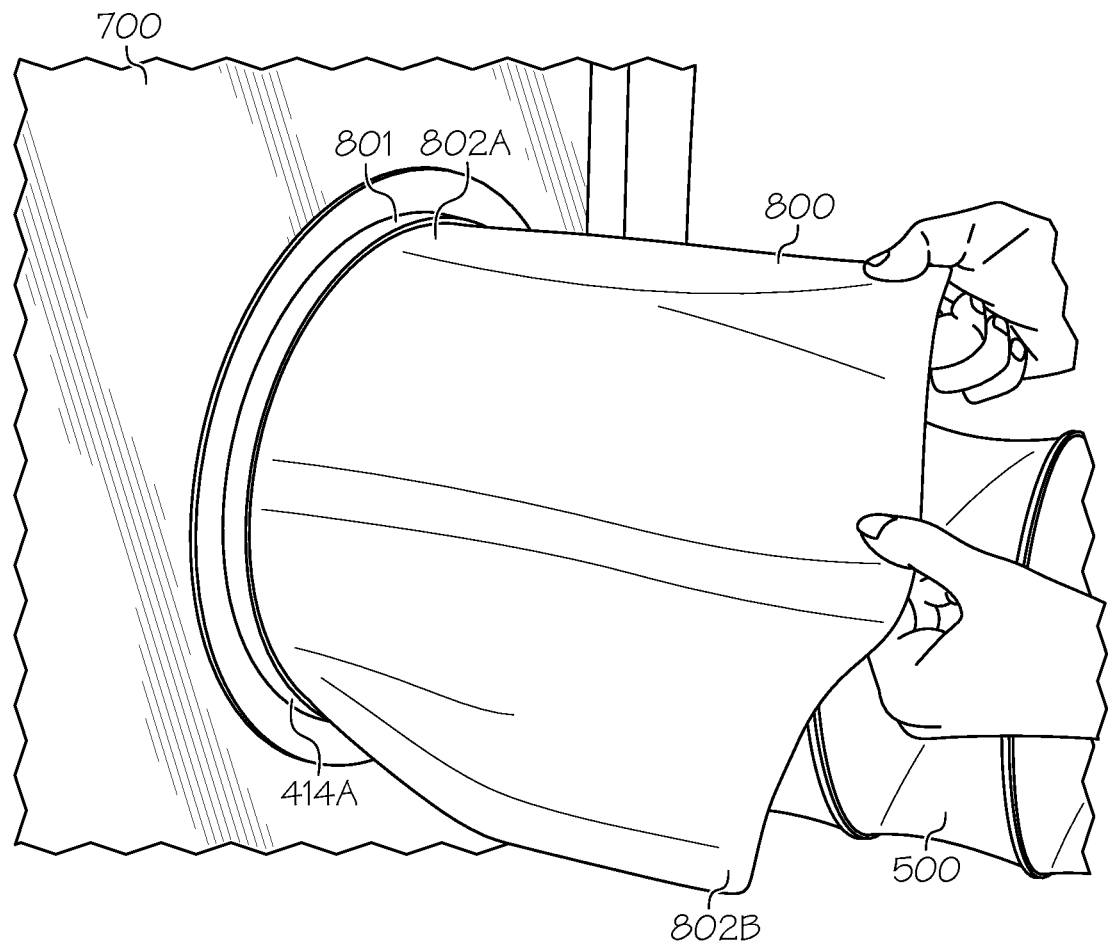

FIG. 12 is perspective view of an embodiment of an enclosure 800 coupled to the housing frame 402, in accordance with aspects of inventive concepts herein. In this embodiment, the enclosure is coupled to the housing frame 402 with coupling mechanism 801 comprising an adjustable hose clamp. A first end 802A, or proximal end of the enclosure 800 includes an opening that is sized to interface with an outer portion 414A of the external flange 414 of the first frame portion 400. In this embodiment, the outer portion 414A of the flange 414 comprises a seat constructed and arranged to receive the first end 802A of the enclosure 800. The seat of the outer portion 414A is of a sufficient width to receive the coupling mechanism 801.

In some embodiments, the coupling mechanism 801 comprises an elastic band that can be secured about the outer portion 414A of the flange 414. In some embodiments, the coupling mechanism 801 comprises an adjustable hose clamp that can be clamped about the outer portion 414A of the flange 414. In some embodiments, the coupling mechanism 801 comprises a ribbon that can be tensioned about the outer portion 414A of the flange 414. In some embodiments, the outer portion 414A of the external flange 414 includes a seat comprising a slotted frame for receiving and securing a coupling feature of the proximal end 802A of the enclosure 800.

In some embodiments, the enclosure 800 comprises a sock with first and second openings at the respective first and second ends, 802A, 802B. In some embodiments, the enclosure is cylindrical or semi-conical in shape.

Figure 13:
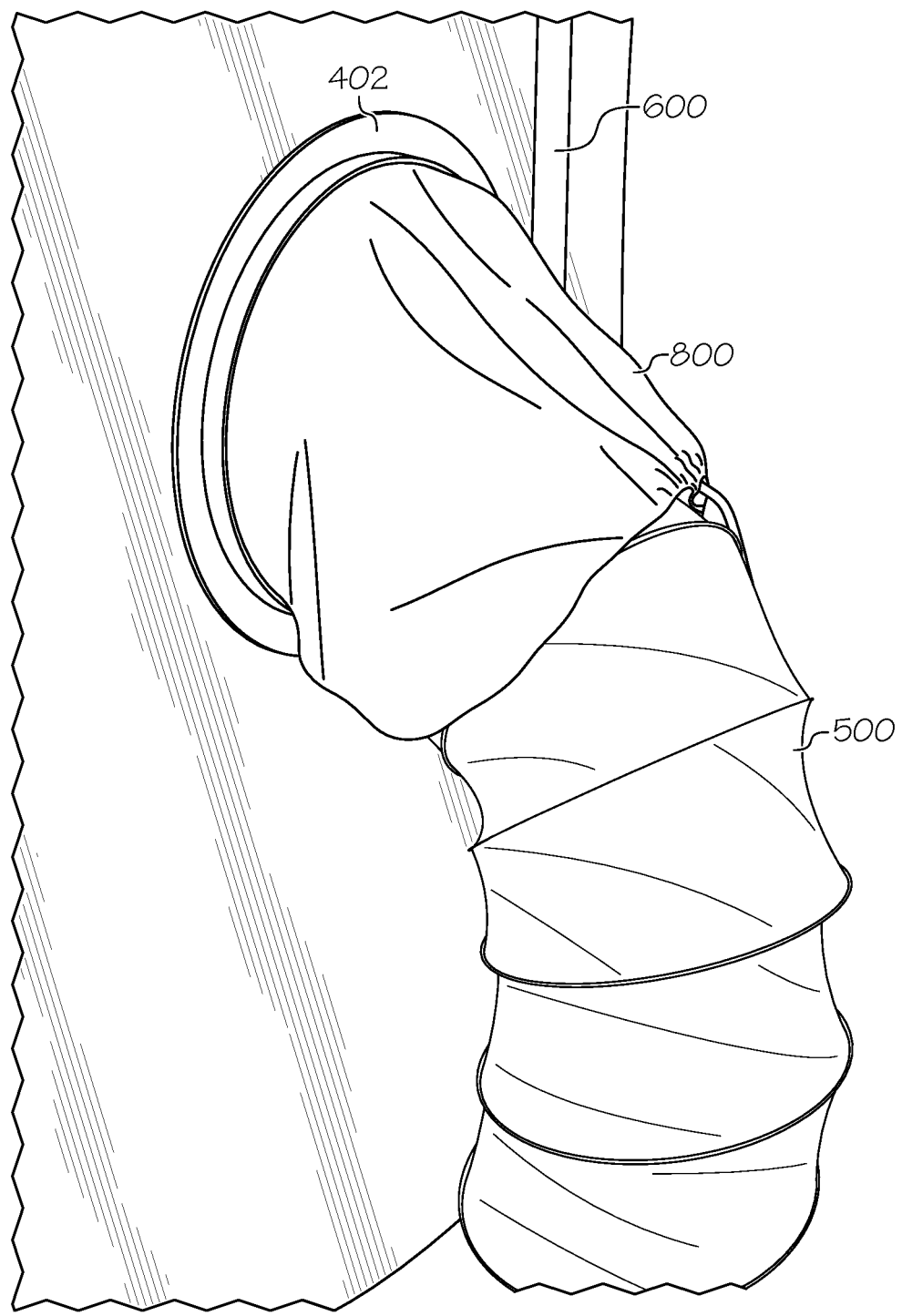

FIG. 13 is a perspective view of an embodiment of an air duct 500 and an enclosure 800 coupled to the housing frame 402, in accordance with aspects of inventive concepts herein.

Figure 14:
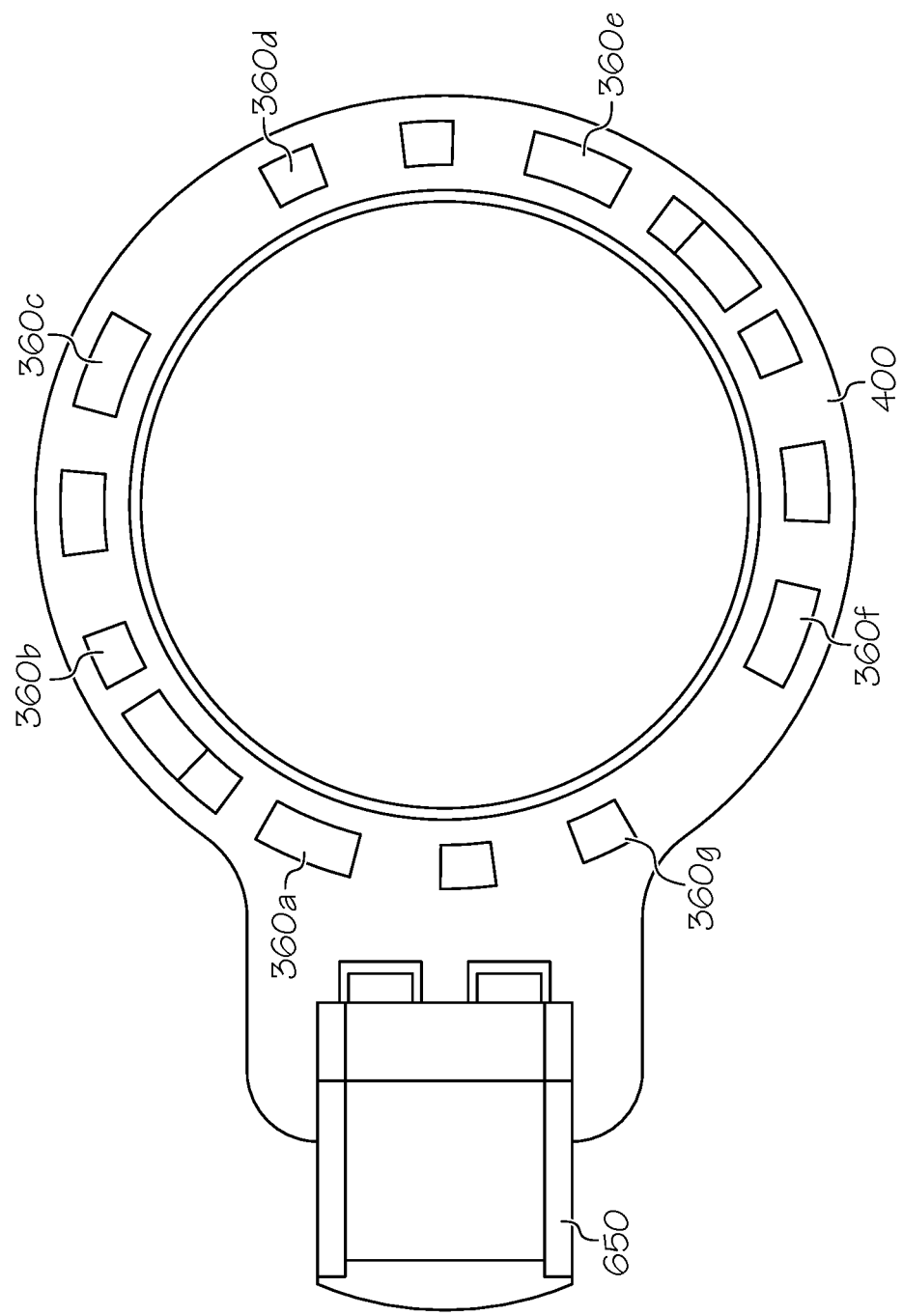
FIG. 14 is a front view of an embodiment of a housing frame including magnetic coupling mechanisms, in accordance with aspects of inventive concepts herein.

FIG. 14 is a front view of an embodiment of a first frame portion 400 including one or more magnets, in accordance with aspects of inventive concepts herein. In the embodiment shown in FIG. 14 the first frame portion 400 of the housing frame comprises seven (7) magnets 360 a-g. Alternative embodiments comprise a different number of magnets. In the embodiment shown in FIG. 14, the magnets 360 are fitted into the first frame portion 400 and the magnets 360 comprise a rectangular shape. In alternative embodiments, the magnets comprise a different shape, for example, a circle, a triangle, or any such polygon. In alternative embodiments, with more than one magnet, the different magnets are all the same shape. In alternative embodiments, with more than one magnet, one or more of the magnets are different shapes.

In some embodiments, the second frame portion 450 comprises one or more magnets. In some embodiments, the one or more magnets 360 on the first frame portion 400 of the housing frame 402 couple to the one or more magnets on the second frame portion 450 of the housing frame 402. In some embodiments, the one or more magnets 360 at the first frame portion 400 face away from the second frame portion 450 of the housing frame 402. The respective magnets of the first and second frame portions 400, 450 are of opposite polarity so as to be magnetically attracted to each other as the first and second frame portions 400, 450 are brought into contact with each other, thereby further securing the coupled first and second frame portions 400, 450.

In some embodiments the magnets can be located on one of the first or second frame portions, and the other of the first or second frame portions can be formed of a magnetically attractive material.

In some embodiments, the first frame portion 400 and the second frame portion 450 are coupled using the mechanisms described in connection with FIG. 7-8 as well as the magnetic mechanism described in connection with FIG. 14.

Figure 15:
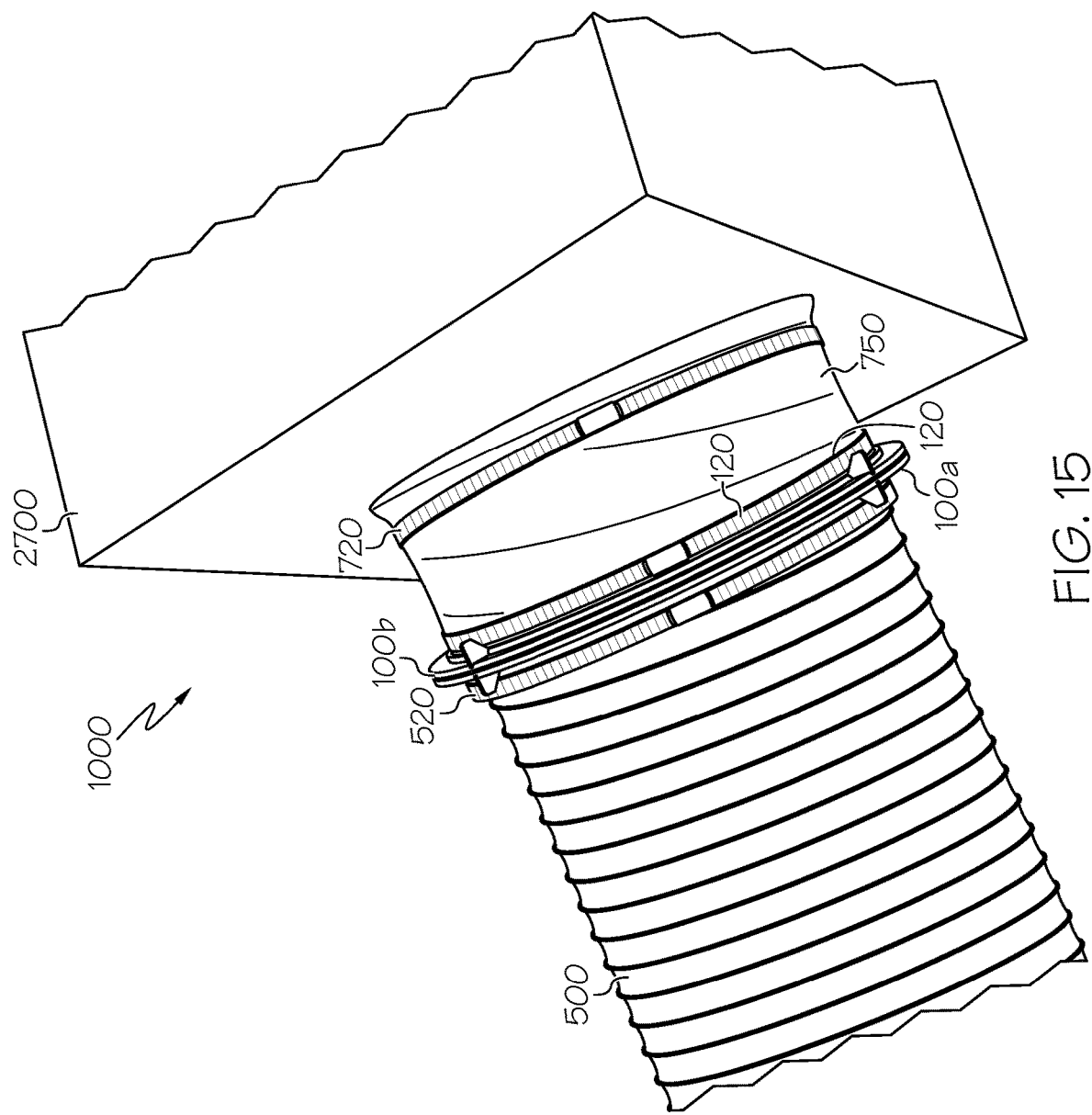
FIG. 15 is perspective view of an embodiment of a system, in accordance with aspects of inventive concepts herein.
Figure 16:
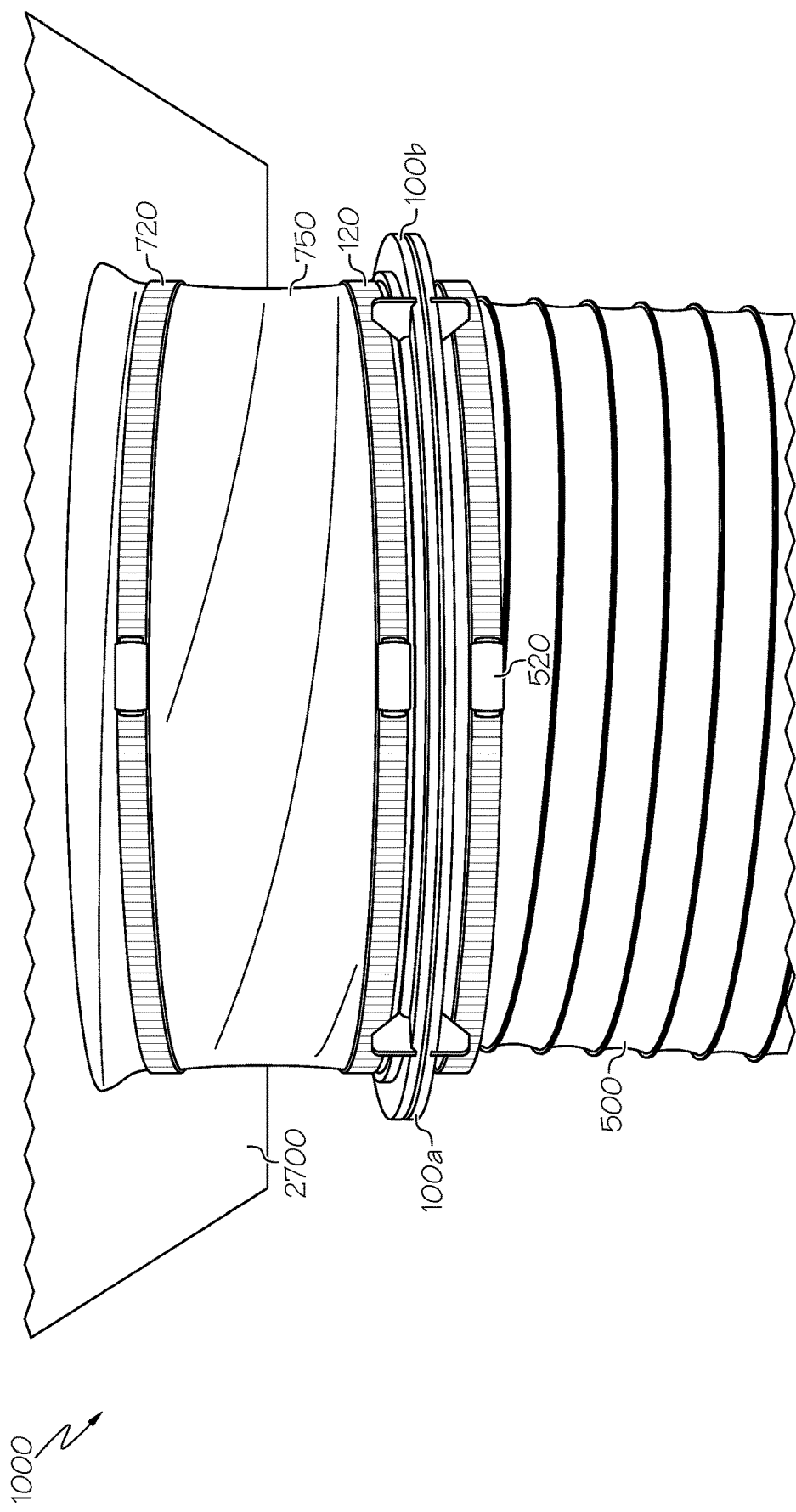
FIG. 16 is a top view of an embodiment of the system, in accordance with aspects of inventive concepts herein.

FIG. 15 is perspective view and FIG. 16 is a top view of an embodiment of a system 1000, in accordance with aspects of inventive concepts herein. In some embodiments, the system 1000 comprises an air duct 500 and an air filter 2700. In this embodiment, the system 1000 also comprises a duct coupler system comprising a first duct coupler 100a and a second duct coupler 100b, wherein the first duct coupler 100a is coupled to the second duct coupler 100b.

In some embodiments, the air duct 500 is flexible. In some embodiments, the air duct 500 is extendable. In some embodiments, the air duct 500 comprises metal, including, but not limited to, aluminum, steel, brass, or any such suitable material. In some embodiments, the air duct 500 comprises cloth. In some embodiments, the air duct 500 comprises plastic.

In the embodiment shown in FIG. 15, the air duct 500 is coupled to the first duct coupler 100a using an air duct clamp 520. In some embodiments, the air duct clamp 520 comprises a hose clamp that secures an end region of the air duct to a flange or seat on the duct coupler 100 as described herein. In some embodiments, the air duct clamp 520 comprises metal. In alternative embodiments, the air duct clamp 520 comprises cloth, plastic, or any such suitable material. The air duct clamp 520 is constructed and arranged to tighten around the air duct 500 and the duct coupler 100, securing an end region of the air duct 500 to the duct coupler 100.

In some embodiments, the air filter 2700 is coupled to a coupling duct 750. In some embodiments, the coupling duct 750 is extendable and flexible. In some embodiments, the coupling duct 750 comprises metal, including, but not limited to, aluminum, steel, brass, or any such suitable material. In some embodiments, the coupling duct 750 comprises cloth. In some embodiments, coupling duct 750 comprises plastic.

In the embodiment shown in FIG. 15, the air filter 2700 is coupled to the coupling duct 750 using a filter clamp 720. In some embodiments, the air duct clamp 520 comprises an adjustable hose clamp. In some embodiments, the filter clamp 720 comprises metal. In alternative embodiments, filter clamp 720 comprises cloth, plastic, or any such suitable material. The filter clamp 720 is constructed and arranged to tighten around the coupling duct 750 and the opening of the air filter 2700, securing the coupling duct 750 to the air filter 2700.

In the embodiment shown in FIG. 15, the second duct coupler 100b is coupled to the coupling duct 750 using a coupler clamp 120. In some embodiments, the air duct clamp 520 comprises a hose clamp. In the embodiment shown in FIG. 15, the coupler clamp 120 comprises metal. In alternative embodiments, the coupler clamp 120 comprises cloth, plastic, or any such suitable material. The coupler clamp 120 is constructed and arranged to tighten around the coupling duct 750 and the second duct coupler 100b, securing the coupling duct 750 to the duct coupler 100b.

FIG. 16 is a top view of an embodiment of the system 1000, in accordance with aspects of inventive concepts herein. In the embodiment shown in FIG. 15 and FIG. 16 each duct coupler 100a, b comprises a circular ring shape. In alternative embodiments, each duct coupler 100 comprises a different shape, such as, but not limited to, a square, rectangle, a triangle, or any polygon.

Figure 17:
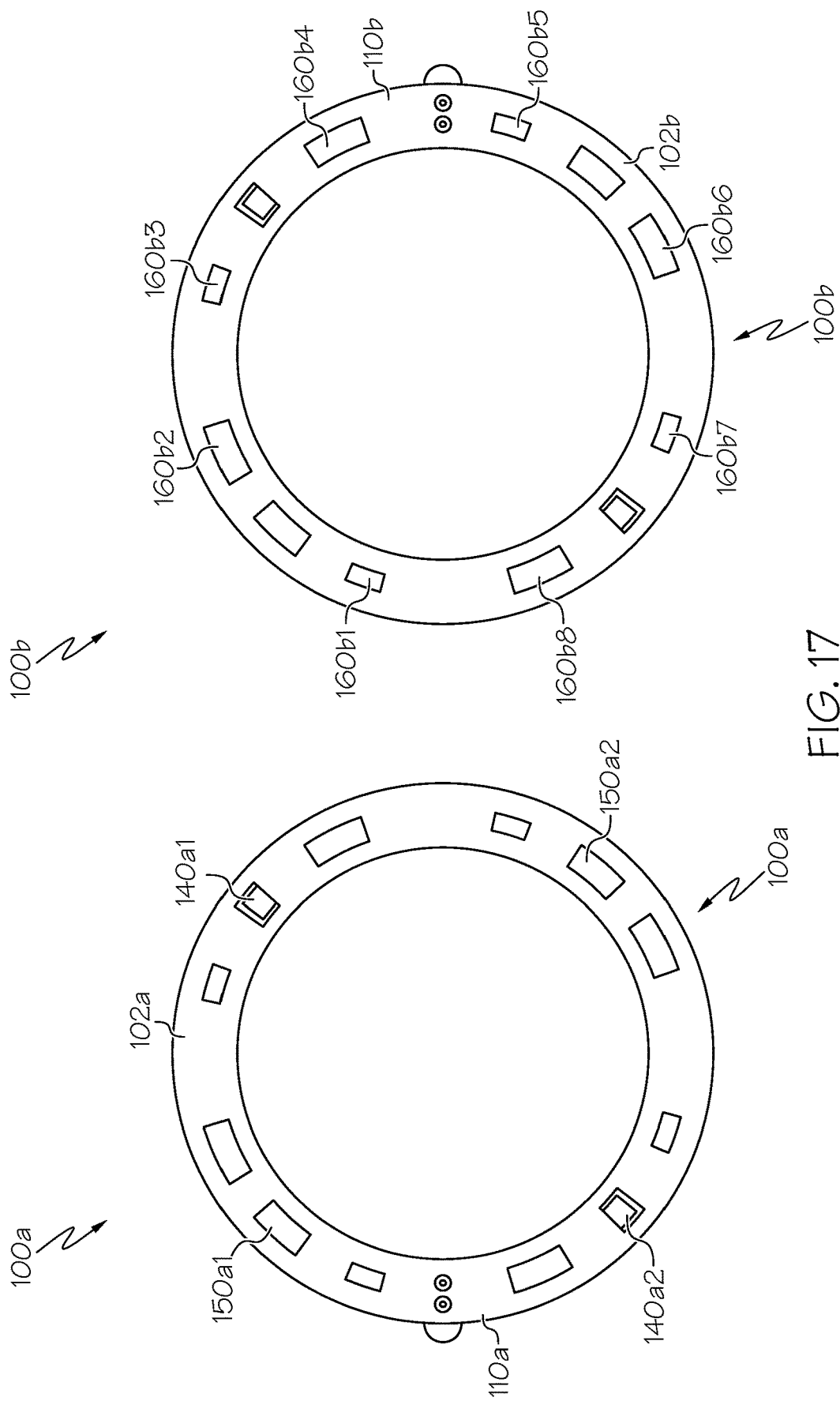
FIG. 17 is a top view of an embodiment of the first duct coupler and the second duct coupler, in accordance with aspects of inventive concepts herein.
Figure 18:
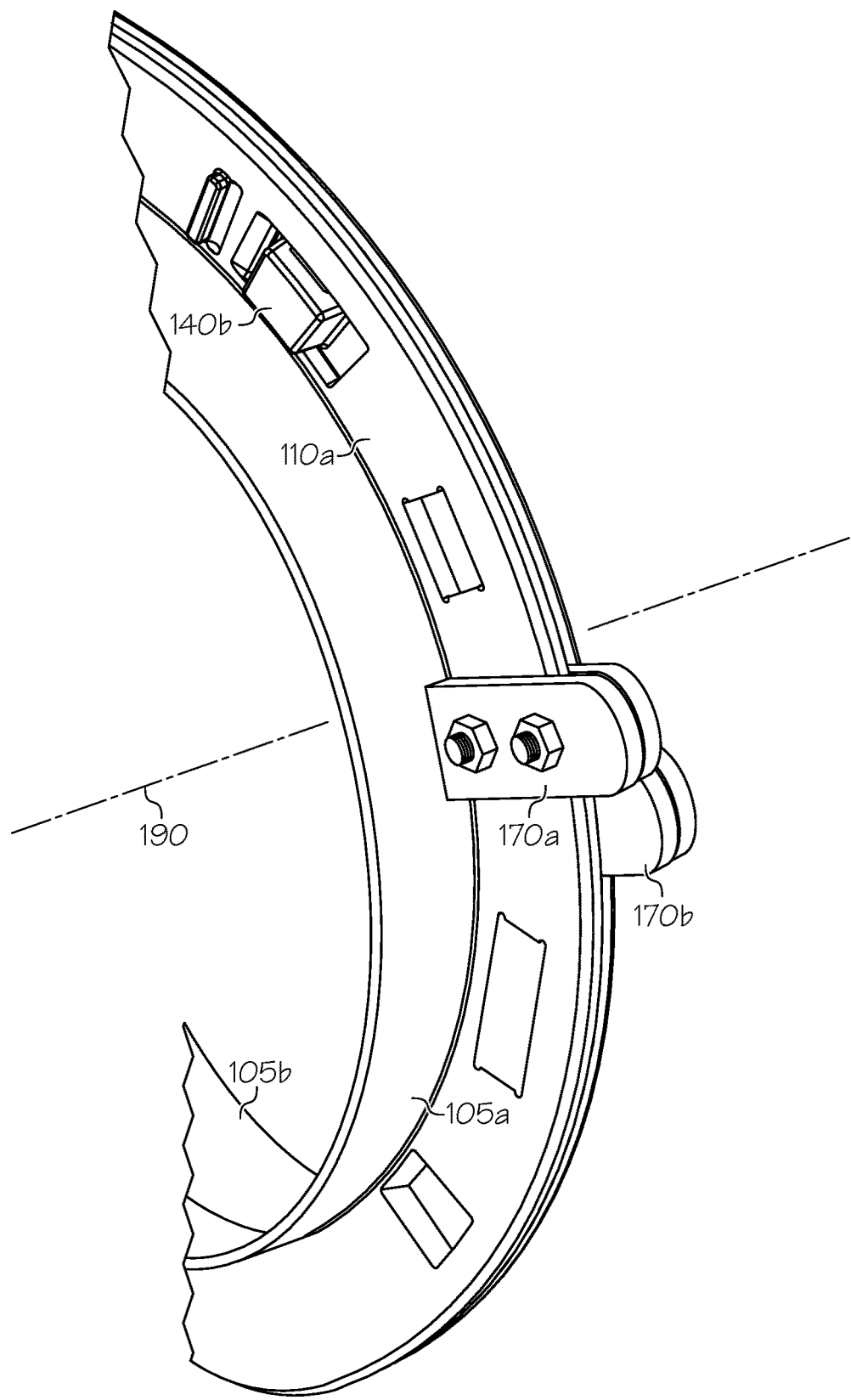
FIG. 18 is top perspective view of an embodiment of the first duct coupler and second duct coupler of FIG. 17, in accordance with aspects of inventive concepts herein.

FIG. 17 is a top view and FIG. 18 is top perspective view of an embodiment of the first duct coupler 100a and the second duct coupler 100b, in accordance with aspects of inventive concepts herein. In this embodiment the first duct coupler 100a and the second duct coupler 100b are identical, and, as a result, the terms first and second may be used interchangeably. In alternative embodiments, the first duct coupler 100a and the second duct coupler 100b are not identical. The advantage of the first duct coupler 100a and the second duct coupler 100b being identical is that the same coupler can be used at both ends of a duct and that coupler can be used as a male connector or a female connector, as described herein.

In the embodiment shown in FIG. 17, each duct coupler 100 comprises a base 110 extending in a first plane and oriented about a first axis 190. In FIG. 17, the first plane is parallel with the surface and the first axis 190 extends towards the viewer. In the embodiment of FIG. 17, each duct coupler 100 also comprises an attachment mechanism coupled to the base. In this embodiment, when the first duct coupler 100a is coupled to the second duct coupler 100b, the two couplers are arranged such that that base 110a of the first duct coupler 100a is adjacent to the base 110b of the second duct coupler 100b.

In the embodiment shown in FIG. 17, the attachment mechanism for the first duct coupler 100a and/or the second duct coupler 100b comprise one or more claws 140a1, 140a2 (the claws are only labeled on the first coupler in FIG. 17). In alternate embodiments, the first and/or second couplers comprises a different number of claws 140. In the embodiment shown in FIG. 17, the first duct coupler 100a and the second duct coupler 100b comprise two cavities 150a1, 150a2 (the cavities are only labeled on the first coupler in FIG. 17). In alternative embodiments, the first and/or second coupler comprises a different number of cavities. In some embodiments, each claw 140 on the first/second coupler is constructed and arranged to mate with a corresponding cavity 150 on the second/first coupler 100. When the claw 140 is coupled at the corresponding cavity 150, the first coupler 100a is secured to the second coupler 100b.

In some embodiments, the attachment mechanism of the first duct coupler 100a and/or the second duct coupler 100b comprises one or more magnets 160. In the embodiment shown in FIG. 17 both the first duct coupler 100a and the second duct coupler 100b comprise eight (8) magnets 160a1-a8, 160b1-b8 (the magnets are only labeled on the second coupler in FIG. 17). In alternative embodiments, the first duct coupler 100a and/or second duct coupler 100b comprises a different number of magnets 160. In the embodiment shown in FIG. 17 the magnets at the first duct coupler 100a are flush with a surface of the base 110a of the first duct coupler 100a. In the embodiment shown in FIG. 17 the magnets at the second duct coupler 100b are flush with a surface of the base 110b of the second duct coupler 100b. In alternative embodiments, the magnets are not flush with a surface. In some embodiments, the magnets 160 are arranged such that the magnets at the first duct coupler 100a are attracted to the magnets at the second duct coupler 100b and secure the first duct coupler 100a and the second duct coupler 100b to each other.

FIG. 18 is top perspective view of an embodiment of the first duct coupler 100a and second duct coupler 100b of FIG. 17, in accordance with aspects of inventive concepts herein. In some embodiments, the first duct coupler 100a and/or the second duct coupler 100b comprises an inner frame 105. In the embodiment shown in FIG. 18, both the first duct coupler 100a and the second duct coupler 100b comprise an inner frame 105a, b. In the embodiment shown in FIG. 18, the first inner frame 105a is coupled to the base 110a of the first duct coupler 100a and the position of a first inner frame 105a is fixed relative to the base 110a. In the embodiment shown in FIG. 18, the second inner frame 105b is coupled to the base 110b of the second duct coupler 100b and the position of a second inner frame 105b is fixed relative to the base 110b. In alternative embodiments, the position of the inner frame is not fixed relative to the base 110. In some embodiments, the inner frame extends in a direction transverse to the first plane and is oriented about the first axis 190.

In FIG. 18 a first duct coupler 100a is coupled to a second duct coupler 100b. In FIG. 18 a claw 140b from the second duct coupler 100b is shown passing through a cavity 150a on the first coupler. When the couplers 100 are secured together the claw 140b extends over a portion of the base 110a of the first duct coupler 100a.

In the embodiment shown in FIG. 18, the first duct coupler 100a comprises a first separation tab 170a. In this embodiment, the first separation tab 170a is coupled to the base 110a of the first duct coupler 100a. In this embodiment shown in FIG. 18, the second duct coupler 100b comprises a second separation tab 170b. In this embodiment, the second tab 170b is coupled to the base 110b of the second duct coupler 100b. The first separation tab 170a and the second separation tab 170b assist the user in joining/releasing the first duct coupler 100a and the second duct coupler 100b.

Figure 19:
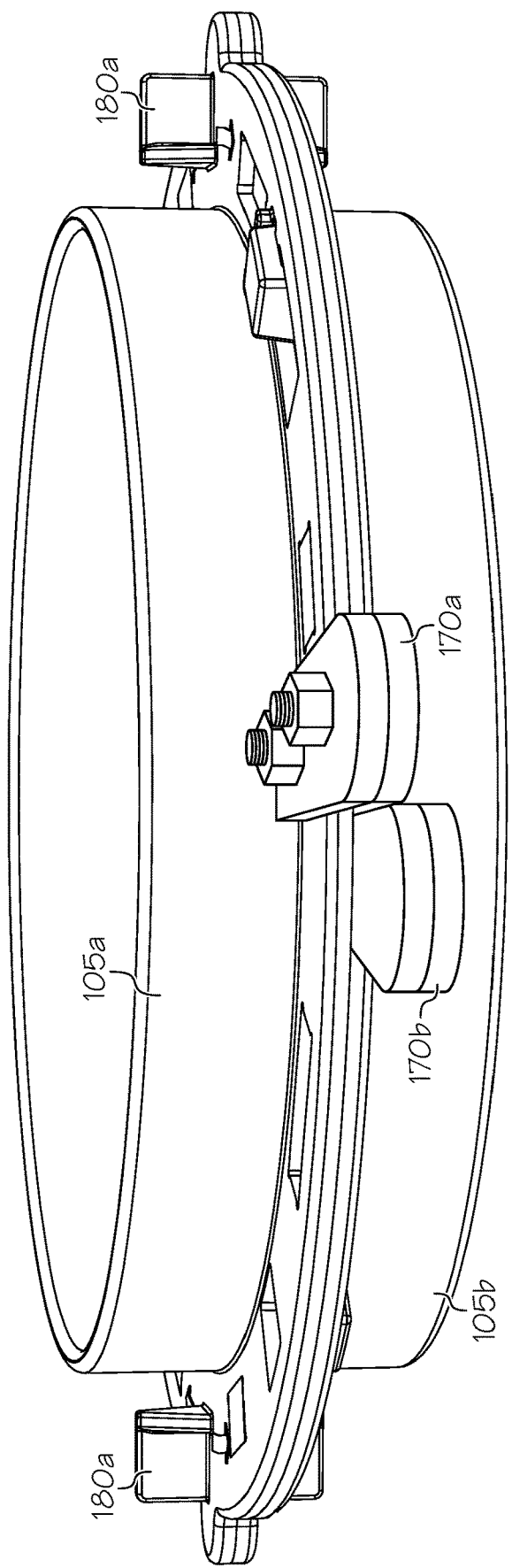
FIG. 19 is a side perspective view of an embodiment of the first duct coupler and second duct coupler of FIG. 17, in accordance with aspects of inventive concepts herein.

FIG. 19 is a side perspective view of an embodiment of the first duct coupler 100a and second duct coupler 100b of FIG. 17, in accordance with aspects of inventive concepts herein. In some embodiments, the first duct coupler 100a and/or second duct coupler 100b comprise one or more rotation tabs 180. In the embodiment shown in FIG. 19, the first duct coupler 100a comprises two rotation tabs 180a. Each rotation tab 180 assists the user in rotating the first 100a and/or second duct coupler 100b. Each rotation tab 180 also assists the user in joining/releasing the first duct coupler 100a and the second duct coupler 100b.

Figure 20:
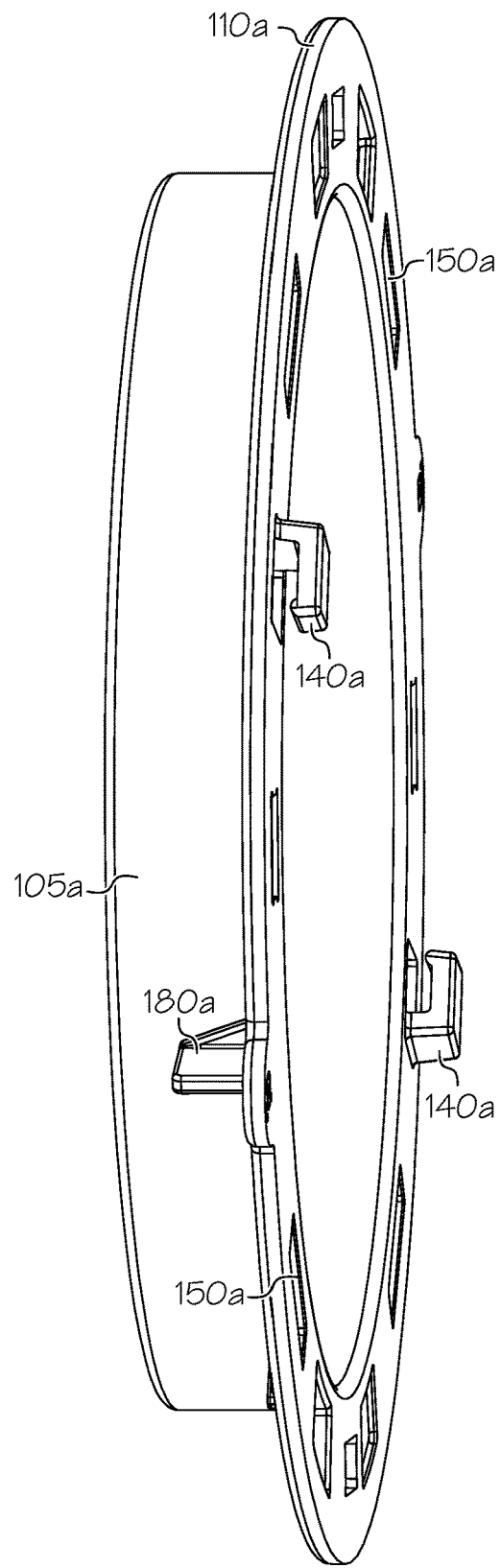
FIG. 20 is a side perspective view of an embodiment of a duct coupler, in accordance with aspects of inventive concepts herein.

FIG. 20 is a side perspective view of an embodiment of a duct coupler 100, in accordance with aspects of inventive concepts herein. In this embodiment, the duct coupler 100 comprises two claws 140a. In this embodiment, the claws 140a are oriented in the same direction around the base 110a. Each claw 140a can be inserted into a corresponding cavity of another coupler, such that when the first duct coupler 100a is rotated a portion of the base 110b of the second coupler is positioned between an underside of each claw 140a and the base 110a of the first coupler so the respective first and second claws 140a, 140b secure the first and second duct couplers 100a, 100b to each other. In the present embodiment, the claws 140a, 140b are positioned at 180 degrees relative to each other about the center axis 190. Similarly, the corresponding cavities 150a, 150b are positioned at 180 degrees relative to each other about the center axis 190. The respective claws 140a, 140b and cavities 150a, 150b alternate in position at 90 degree increments relative to the center axis 190. In other embodiments, a single claw 140a and cavity 150a may be employed. In other embodiments, more than two claws 140a, 140b and cavities 150a, 150b may be employed.

Figure 21:
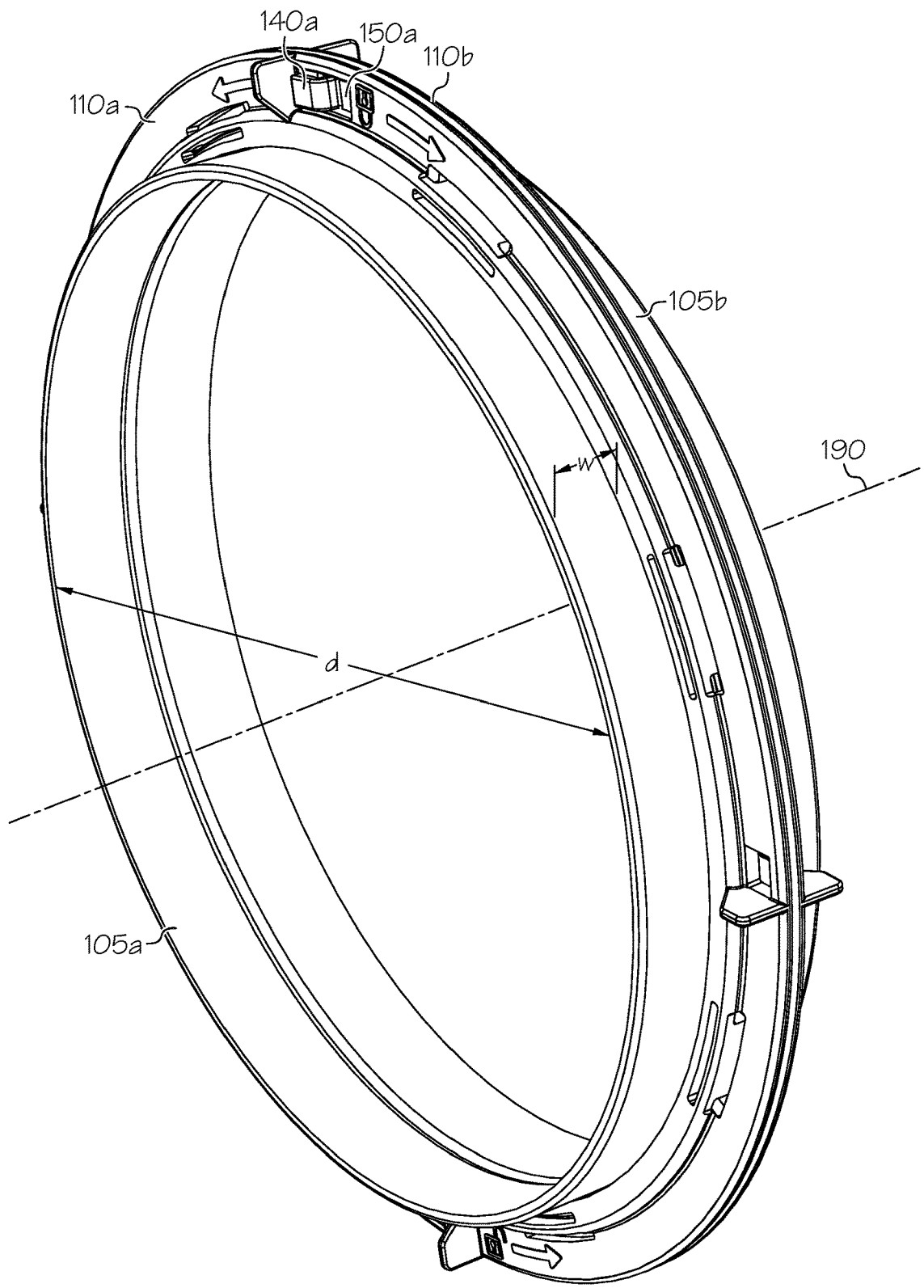
FIG. 21 is a perspective view of an embodiment of a duct coupler, in accordance with aspects of inventive concepts herein.

FIG. 21 is a perspective view of an embodiment of a duct coupler 100, in accordance with aspects of inventive concepts herein. The embodiment shown in FIG. 21 is similar to the embodiment shown in FIG. 20, however, the embodiment in FIG. 21 does not include magnets. In addition, in this embodiment, each inner frame 105a, b is rotatably coupled to the corresponding base 110a, 110b.

In the embodiment shown in FIG. 21, the first inner frame 105a is rotatably coupled to the first base 110a. In some embodiments, the first inner frame 105a comprises a seat of diameter d and a width w for receiving an end portion of an air duct 500. In some embodiments, if the orientation of the air duct 500 rotates, the inner frame 105a rotates as well. In such cases, the rotation of the air duct 500 does not result in the rotation of the duct coupler 100a. In some embodiments, the second inner frame 105b is likewise coupled to an air duct 500. In some embodiments, if the orientation of the air duct 500 rotates, the inner frame 105b rotates as well. In such cases, the rotation of the air duct 500 does not result in a rotation of the second duct coupler 100b. In this manner, joining of first and second air ducts in a system employing the duct coupler of the present embodiment allows for free rotation of one, or both, of the first and second air ducts without affecting the other. The advantage is avoidance of inadvertent kinking of other portions of an air duct system when moving/re-positioning a portion.

In the present embodiment, the claws 140a, 140b are positioned at 180 degrees relative to each other about the center axis 190. Similarly, the corresponding cavities 150a, 150b are positioned at 180 degrees relative to each other about the center axis 190. The respective claws 140a, 140b and cavities 150a, 150b alternate in position at 90 degree increments relative to the center axis 190. In other embodiments, a single claw 140a and cavity 150a may be employed. In other embodiments, more than two claws 140a, 140b and cavities 150a, 150b may be employed.

Figure 22A:
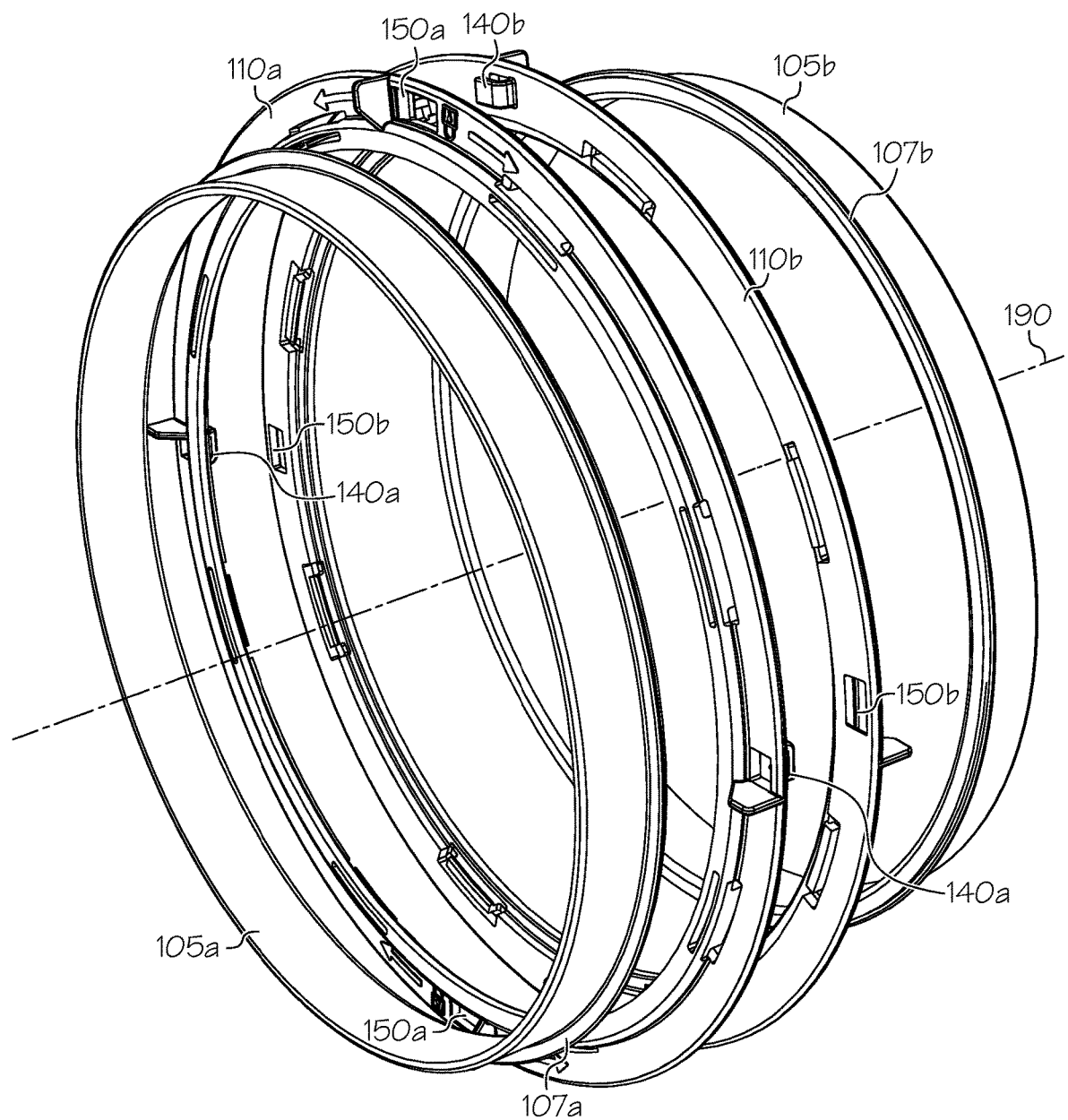
FIG. 22A is an exploded perspective view of an embodiment of the first duct coupler and the second duct coupler of FIG. 21, in accordance with aspects of inventive concepts herein.

FIG. 22A is an exploded perspective view of an embodiment of the first duct coupler 100a and the second duct coupler 100b of FIG. 21, in accordance with aspects of inventive concepts herein. In some embodiments, such as the one shown in FIG. 22A, the inner frame 105 comprises a flange 107. In some embodiments, the base 110 of the duct coupler 100 comprises a seat 117. In some embodiments, the flange 107 of the inner frame 105 couples to the seat 117 of the duct coupler 100.

FIG. 22B is a perspective view of a base 110b of the second duct coupler 100b of FIG. 21, in accordance with aspects of inventive concepts herein. In some embodiments, such as the embodiment shown in FIG. 22B, the base 110b of the duct coupler 100b comprises a seat 117b. In some embodiments, the seat 117 is constructed and arranged to couple with a flange of a corresponding inner frame 105b. In some embodiments, such as the embodiment shown in FIG. 22B, the base 110b of the second duct coupler 100b comprises eight coupler claws 118b1-8. In some embodiments, each of the coupler claws 118b is constructed and arranged to couple the flange 107b of the inner frame 105b to the base 110b and allow the inner frame 105b to rotate about the aperture passing through the duct coupler 100b. The characteristics in FIG. 22B are described in connection with the second duct coupler 100b, but they also apply to the first duct coupler 100a.

Figure 22C:
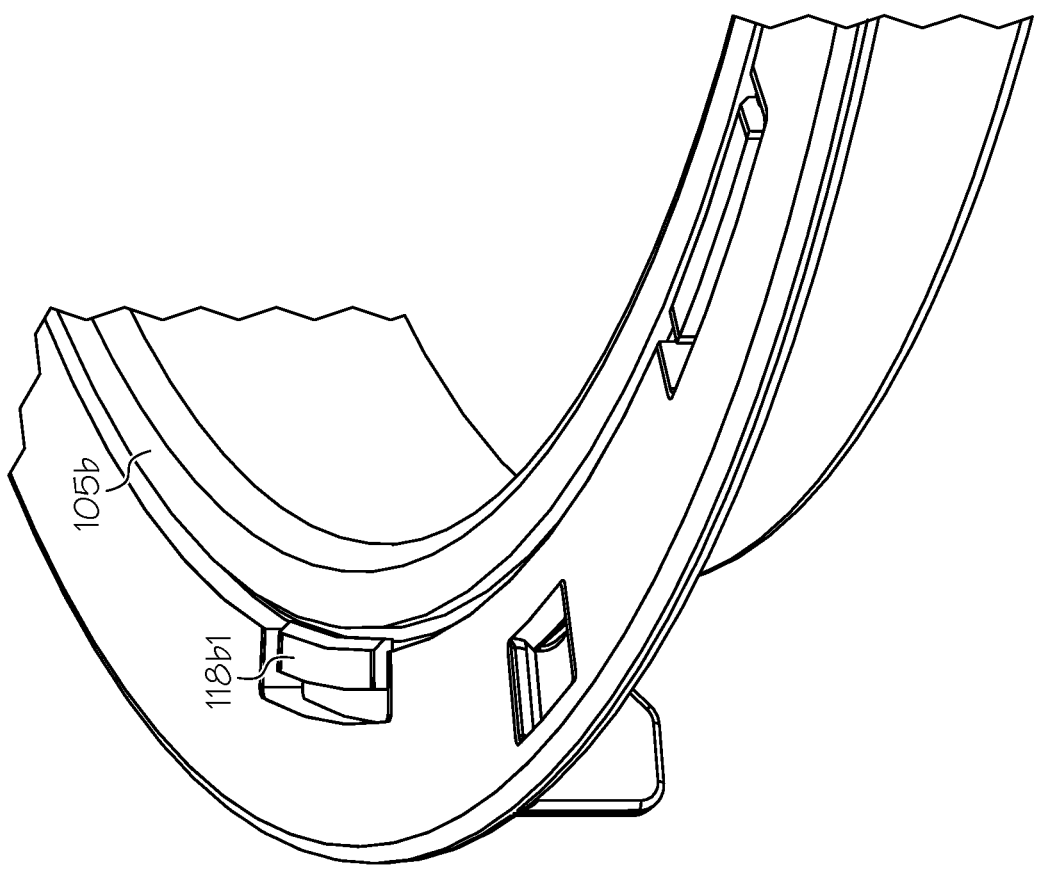
FIG. 22C is a close-up perspective view of the second duct coupler of FIG. 21, in accordance with aspects of inventive concepts herein.

FIG. 22C is a close-up perspective view of the second duct coupler 100b of FIG. 21, in accordance with aspects of inventive concepts herein. In some embodiments, such as the embodiment shown in FIG. 22C, the flange 107b of the inner frame 105b is coupled to the seat 117b. In some embodiments, a portion of the flange 107b is positioned beneath at least one coupler claw 118 such that the inner frame 105b can rotate about the aperture passing through the duct coupler 100b. In some embodiments, a portion of the inner frame 105 is beneath at least one coupler claw 118 and a portion of the inner frame 105b is flush with a lower surface of the base 110b of the second duct coupler 100b. The characteristics in FIG. 22B are described in connection with the second duct coupler 100b, but they also apply to the first duct coupler 100a.

Figure 23:
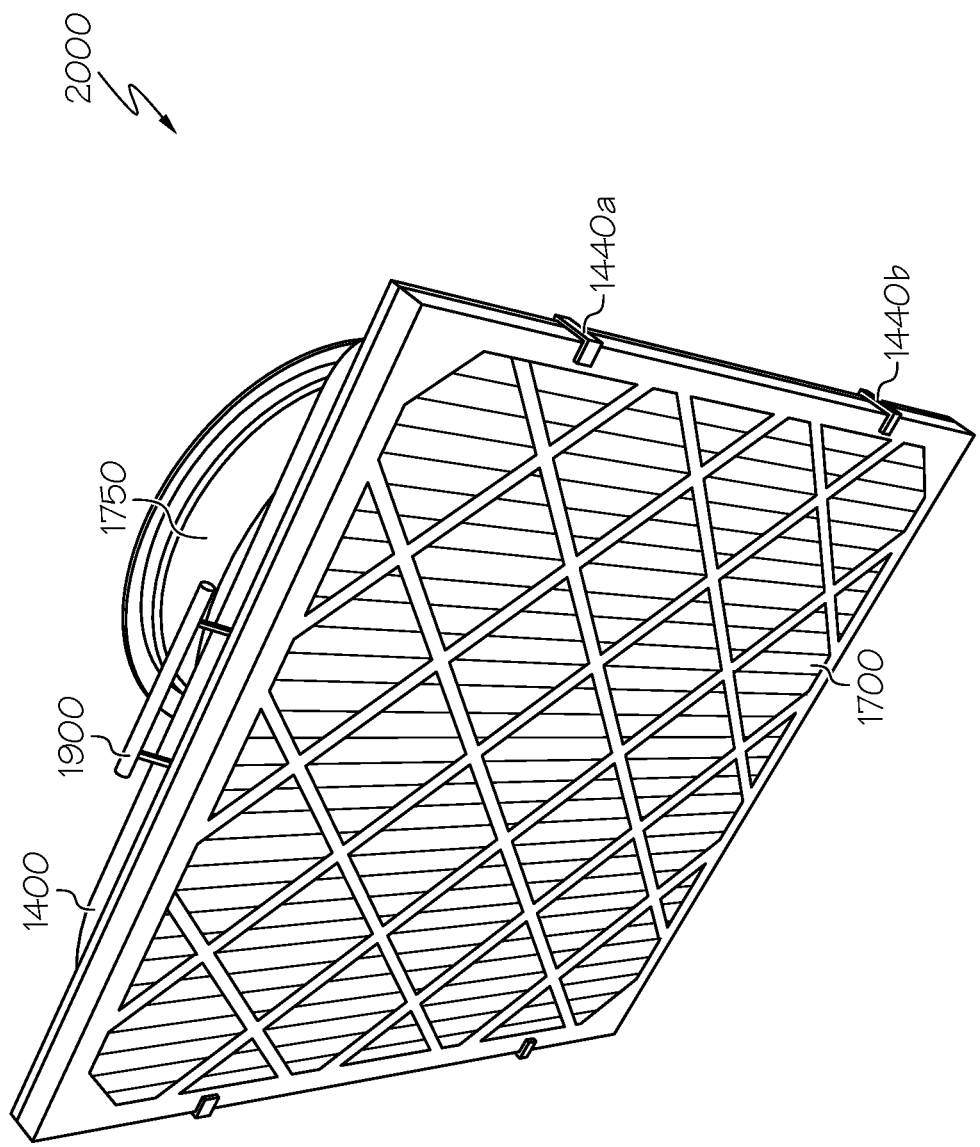
FIG. 23 is a perspective view of an embodiment of an intake/output system, in accordance with aspects of inventive concepts herein.

FIG. 23 is a perspective view of an embodiment of an intake/output system 2000, in accordance with aspects of inventive concepts herein. In some embodiments, the intake/output system 2000 comprises a filter 1700, a portable mount 1400, and a duct 1750. In some embodiments, the portable mount 1400 comprises a first end 1100 coupled to the filter, a second end 1200 constructed and arranged to couple with a duct, and a channel extending from the first end 1100 to the second end 1200 and centered along an axis.

In some embodiments, the portable mount 1400 comprises one or more one handle 1900. In the embodiment shown in FIG. 23, the portable mount 1400 comprises one handle 1900 on the top. In alternative embodiments, the portable mount 1400 comprises more than one handle 1900. In alternative embodiments, the portable mount 1400 does not comprise a handle. In alternative embodiments, the one or more handle 1900 is located in a different position, including, but not limited to, the side, the bottom, etc. of the portable mount 1400.

In some embodiments, one side of the portable mount 1400 is coupled to a filter 1700. In the embodiment shown in FIG. 23, the first end 1100 of the portable mount 1400 is coupled to a filter 1700.

In some embodiments, the portable intake 1400 comprises one or more filter brackets 1440. In the embodiment shown in FIG. 23, the portable mount 1400 comprises four filter brackets 1440 (only 2 shown). In some embodiments, the one or more filter brackets 1440 are constructed and arranged to secure the filter 1700 to the portable mount 1400.

Figure 24:
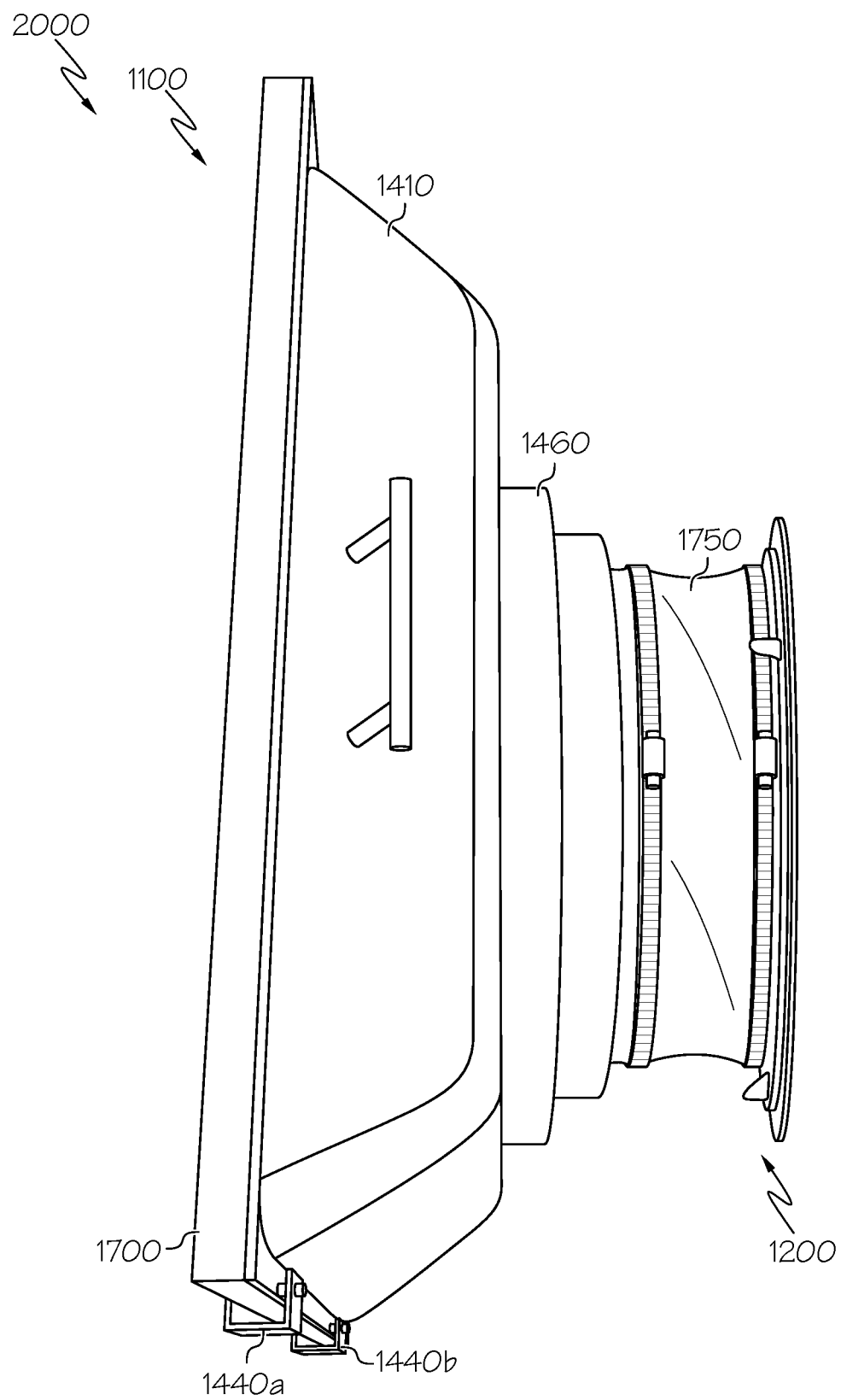
FIG. 24 is a top view of an embodiment of an intake/output system of FIG. 23, in accordance with aspects of inventive concepts herein.

FIG. 24 is a top view of an embodiment of an intake/output system 2000 of FIG. 23, in accordance with aspects of inventive concepts herein. In some embodiments, the portable mount 1400 comprises a first portion 1410 and a second portion 1460. In some embodiments, the first portion 1410 is coupled to a filter 1700. In some embodiments, the first portion 1410 is coupled to a coupling duct 1750. In the embodiment shown, the first portion 1410 is tapered. In alternative embodiments, the first portion 1410 is not tapered.

In some embodiments, the second portion 1460 is coupled to a filter 1700. In some embodiments, the second portion 1460 is coupled to a coupling duct 1750. In some embodiments, the opening of the second portion 1460 is similar in size to the opening of a coupling duct 1750.

Figure 25:
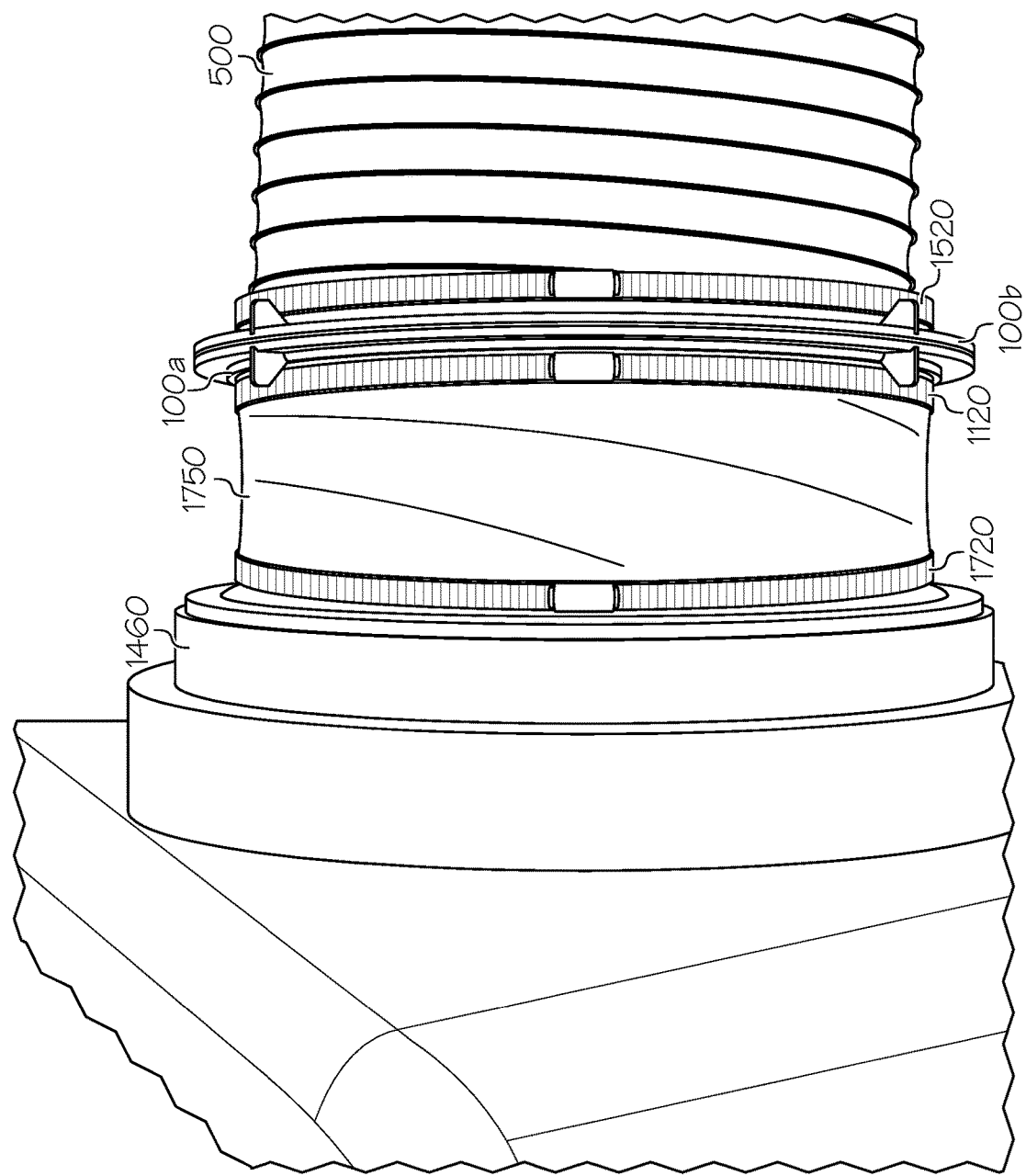
FIG. 25 is a side view of an embodiment of an intake/output system of FIG. 23, in accordance with aspects of inventive concepts herein.

FIG. 25 is a side view of an embodiment of an intake/output system 2000 of FIG. 23, in accordance with aspects of inventive concepts herein. In the embodiment of FIG. 25 the portable mount 1400 is coupled to a coupling duct 1750. In the embodiment of FIG. 25, the coupling duct 1750 is coupled to a first duct coupler 100a. In the embodiment of FIG. 25, the first duct coupler 100a is coupled to a second duct coupler 100b. In this embodiment, the second duct coupler 100b is coupled to an air duct 500.

In the embodiment shown in FIG. 25, the air duct 500 is coupled to the second duct coupler 100b using an air duct clamp 1520. In the embodiment shown in FIG. 25, the air duct clamp 1520 comprises metal. In alternative embodiments, the air duct clamp 1520 comprises cloth, plastic, or any such suitable material. The air duct clamp 1520 is constructed and arranged to tighten around the air duct 500 and the second duct coupler 100b, securing the air duct 500 to the second duct coupler 100b.

In some embodiments, the portable mount 1400 is coupled to a coupling duct 1750. In some embodiments, the coupling duct 1750 is extendable. In some embodiments, the coupling duct 1750 comprises metal, including, but not limited to, aluminum, steel, brass, or any such suitable material. In some embodiments, the coupling duct 1750 comprises cloth. In some embodiments, the coupling duct 1750 comprises plastic.

In the embodiment shown in FIG. 25, the portable mount 1400 is coupled to the coupling duct 1750 using an mount clamp 1720. In the embodiment shown in FIG. 15, the mount clamp 1720 comprises metal. In alternative embodiments, the mount clamp 1720 comprises cloth, plastic, or any such suitable material. The mount clamp 1720 is constructed and arranged to tighten around the coupling duct 1750 and the opening of the portable mount 1400, securing the coupling duct 1750 to the portable mount 1400.

In the embodiment shown in FIG. 25, the first duct coupler 100a is coupled to the coupling duct 1750 using a coupler clamp 1120. In the embodiment shown in FIG. 25, the coupler clamp 1120 comprises metal. In alternative embodiments, the coupler clamp 1120 comprises cloth, plastic, or any such suitable material. The coupler clamp 1120 is constructed and arranged to tighten around the coupling duct 1750 and the first duct coupler 100a, securing the coupling duct 1750 to the first duct coupler 100a.

Figure 26:
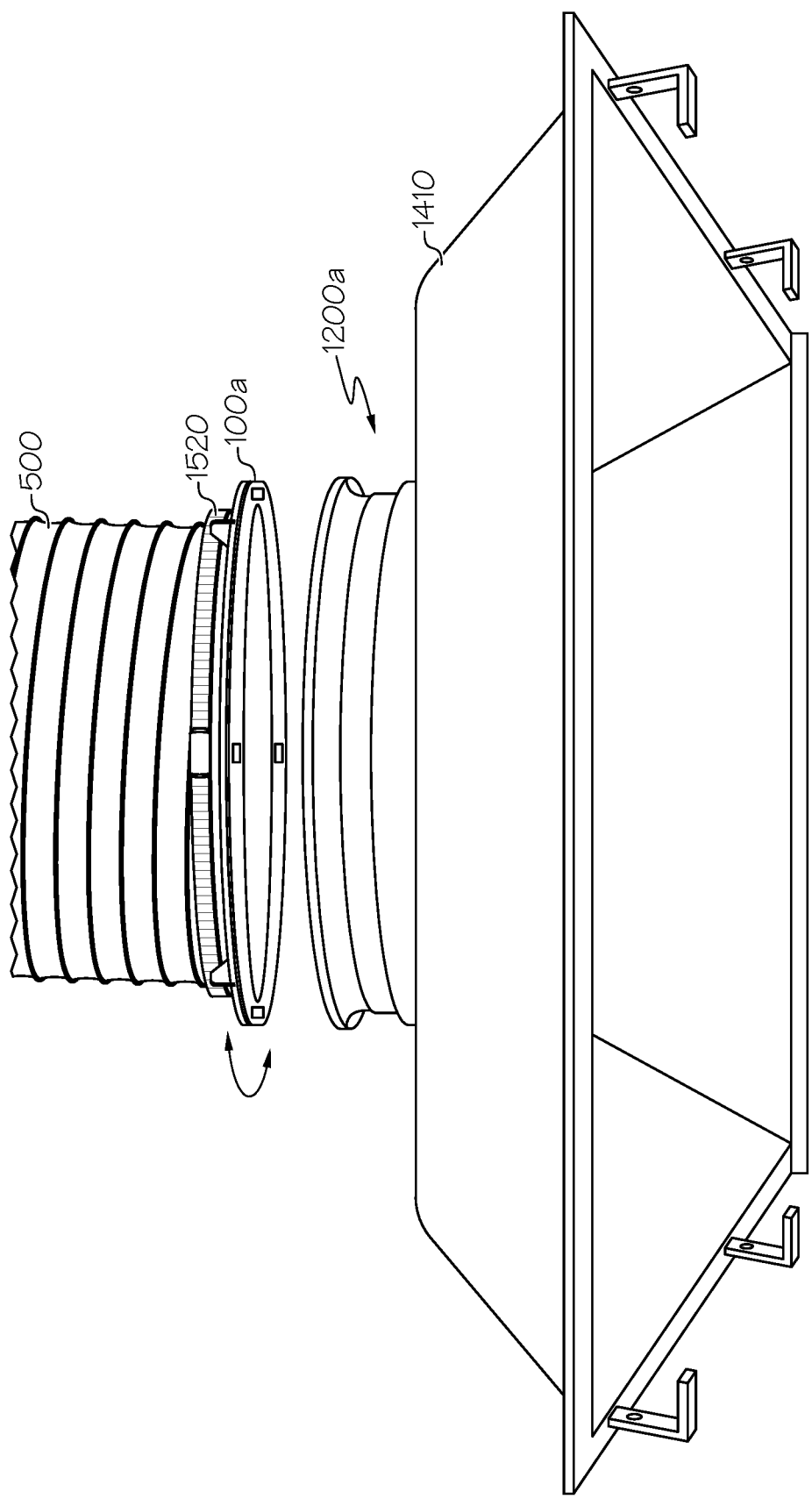
FIG. 26 is a top view of an embodiment of an intake system, in accordance with aspects of inventive concepts herein.

FIG. 26 is a top view of an embodiment of an intake system 2000, in accordance with aspects of inventive concepts herein. In some embodiments, such as the one shown in FIG. 26, a duct coupler 100a couples directly to the second end 1200a of the portable mount 1400. In some embodiments, a first duct coupler 100a couples directly to a second duct coupler 100b, the second duct coupler 100b being directly coupled to the second end 1200a of the portable mount 1400.

Figure 27:
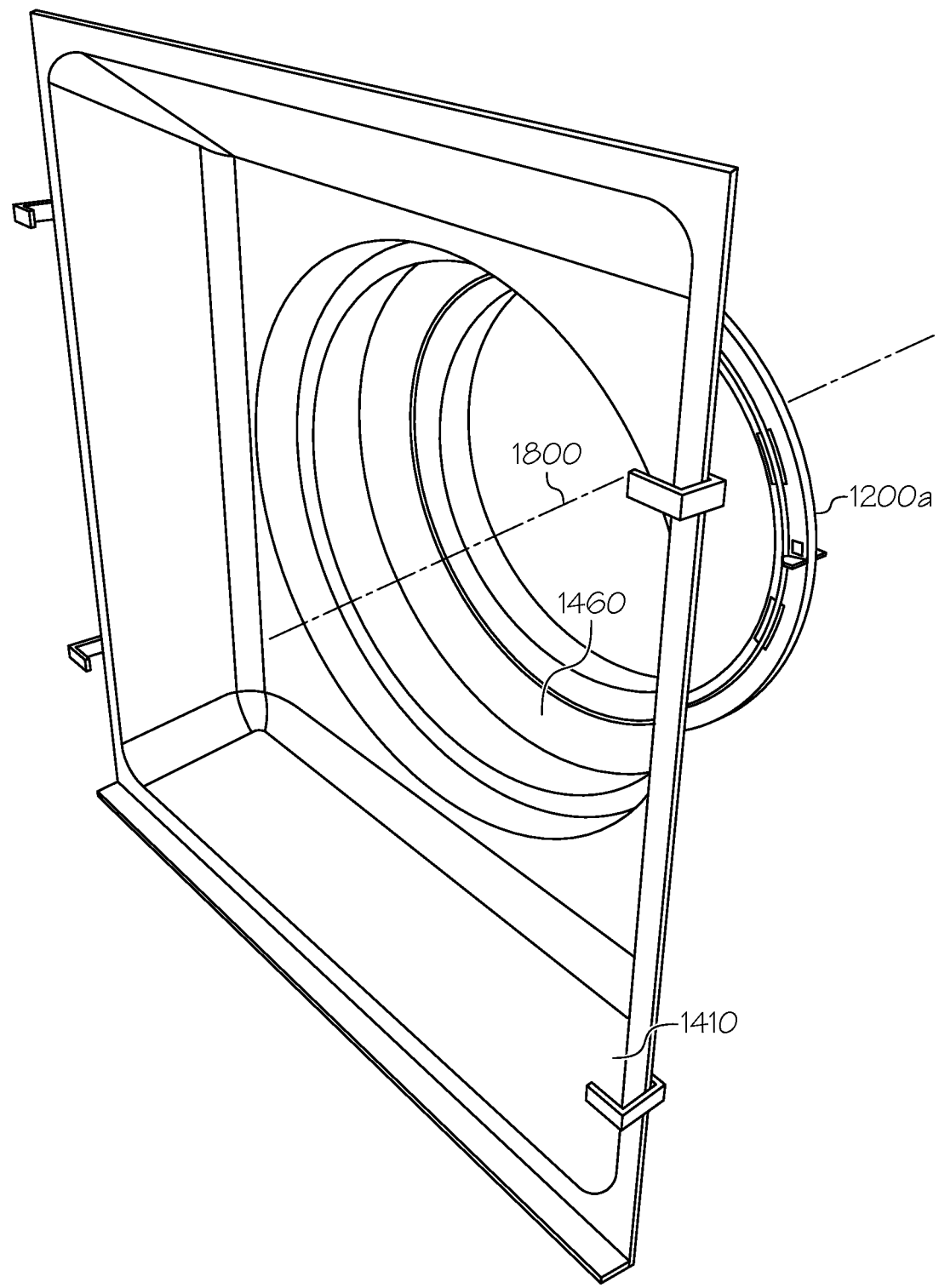
FIG. 27 is a perspective view of an embodiment of an intake system, in accordance with aspects of inventive concepts herein.

FIG. 27 is a perspective view of an embodiment of an intake system 2000, in accordance with aspects of inventive concepts herein.

Figure 28:
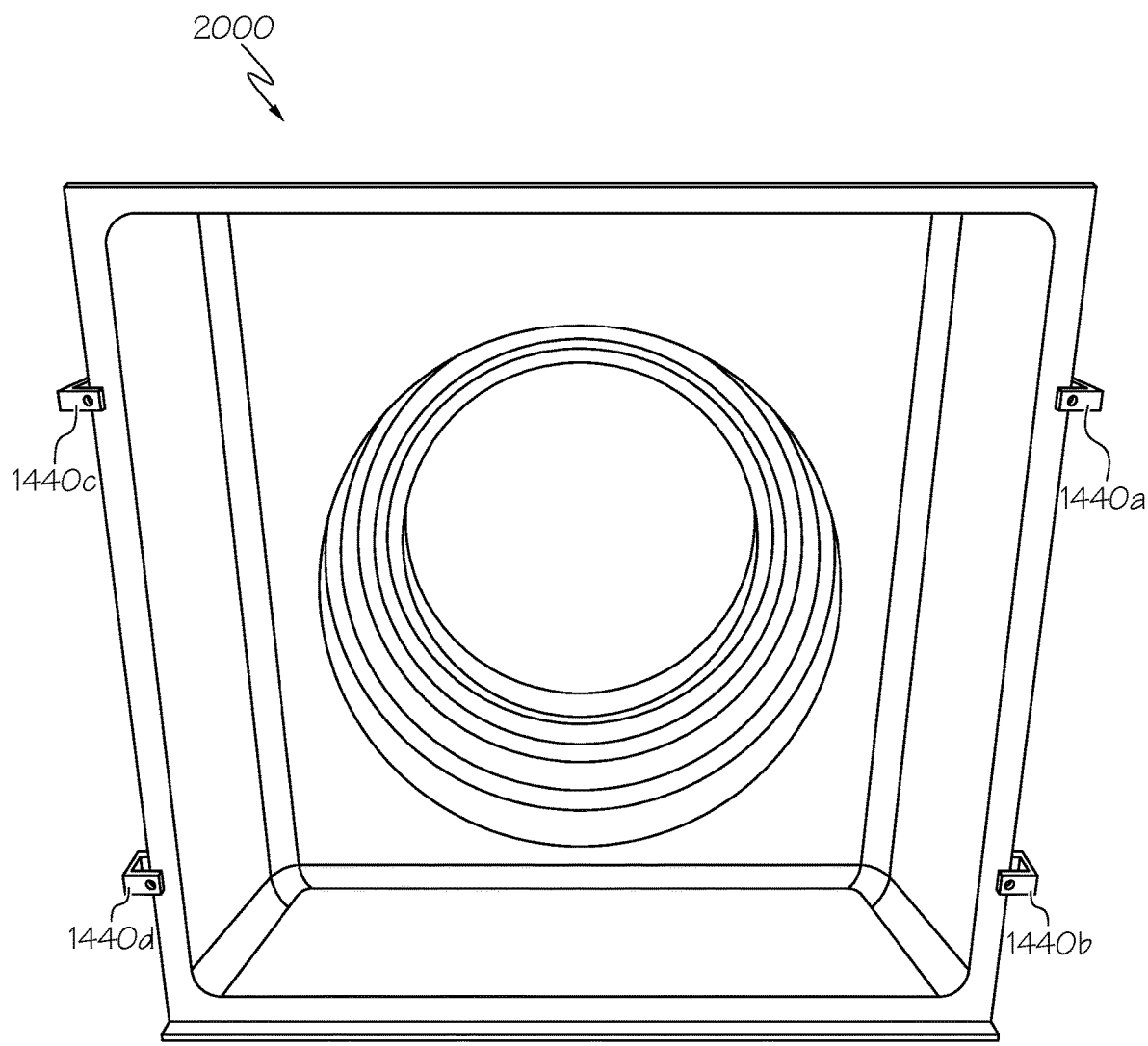
FIG. 28 is a front view of an embodiment of an intake system, in accordance with aspects of inventive concepts herein.

FIG. 28 is a front view of an embodiment of an intake system 2000, in accordance with aspects of inventive concepts herein.

Figure 29:
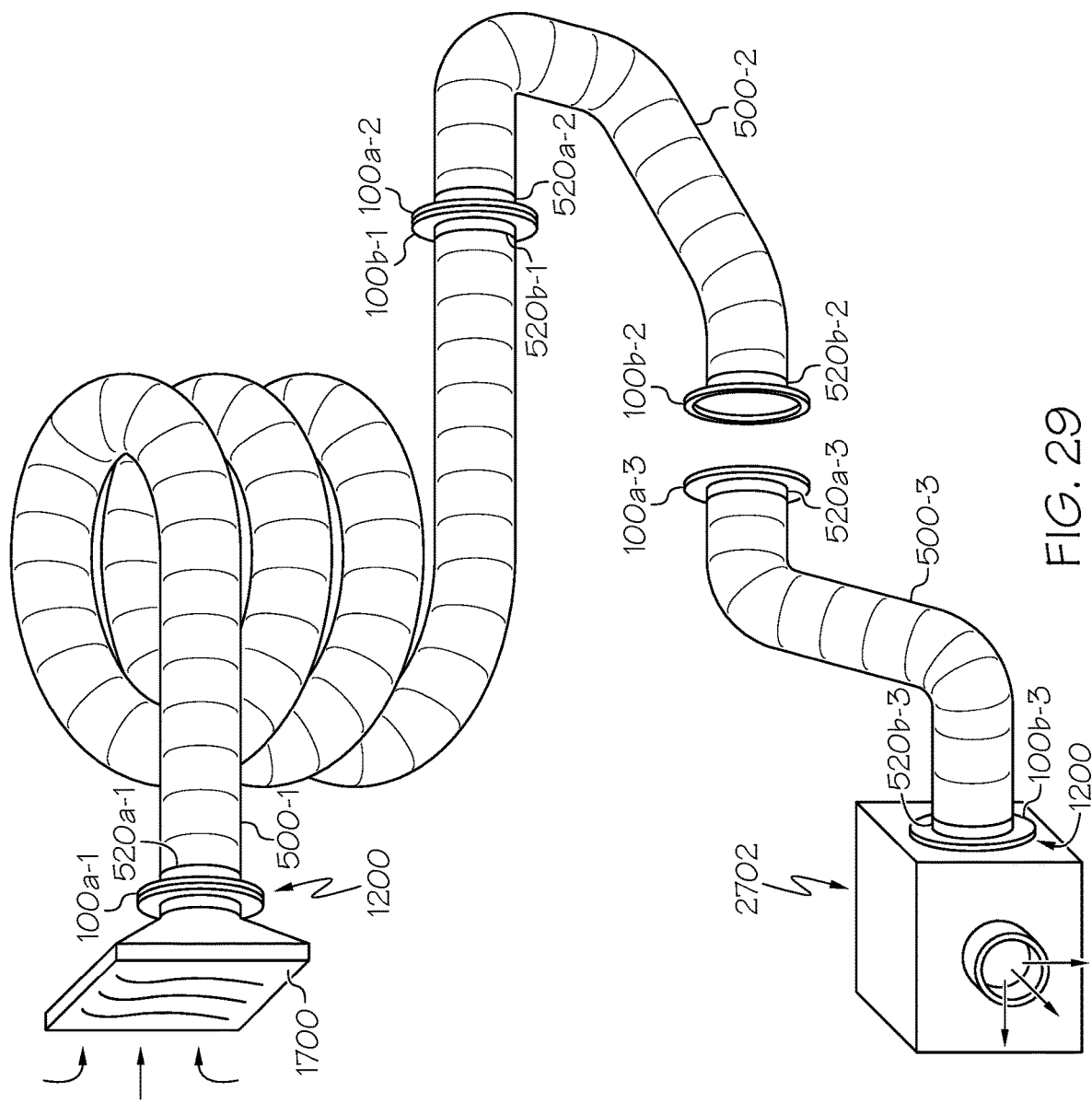
FIG. 29 is a perspective view of an embodiment of a system in accordance with aspects of inventive concepts herein.

FIG. 29 is a perspective view of an embodiment of a system in accordance with aspects of inventive concepts herein. A first air duct 500-1 includes a first duct coupler 100a-1 at a first end and a second duct coupler 100b-1 at a second end. A second air duct 500-2 includes a first duct coupler 100a-2 at a first end and a second duct coupler 100b-2 at a second end. A third air duct 500-3 includes a first duct coupler 100a-3 at a first end and a second duct coupler 100b-3 at a second end. In the present embodiment, the first, second and third air ducts 500-1, 500-2, 500-3 operate as extension ducts for moving air between an air filter 1700 and an air pump 2702 that are remote to each other. In addition, as described herein in connection with the embodiments of FIGS. 21 and 22A-C, the bodies of each of the air ducts 500-1, 2, 3 can rotate relative to their respective first and second duct couplers 100a-1, 2, 3, 100b-1, 2, 3.

The first duct coupler 100-a of the first air duct 500-1 is coupled to a mating duct coupler 1200 of a filter unit 1700, as described herein. The second duct coupler 100b-1 of the first air duct 500-1 is coupled to a first duct coupler 100a-2 of a second air duct 500-2. The second duct coupler 100b-2 of the second air duct 500-2 is in the process of being coupled to a first duct coupler 100a-3 of a third air duct 500-3. The third air duct 500-3 is in turn coupled at its second duct coupler 100b-3 to a mating duct coupler 1200 of the air pump 2702.

As the second duct coupler 100b-2 of the second air duct 500-2 is coupled to a first duct coupler 100a-3 of a third air duct 500-3, the bodies of the first, second and third air ducts 500-1, 500-2, 500-3 can rotate relative to each other and relative to their respective duct couplers 100a-1, 2, 3, 100b-1, 2, 3. Accordingly, the now connected air filter 1700 can be freely positioned to draw air from a desirable location, without concern of causing unwanted bending or kinking of the air ducts 500-1, 500-2, 500-3 between the air filter 1700 and the air pump 2702.

While inventive concepts have been particularly shown and described with references to embodiments thereof, it will be understood by those skilled in the art that various changes in form and detail may be made herein without departing from the spirit and scope of the inventive concepts as defined by the appended claims.

I claim:

1. A housing frame, comprising:
   a first frame portion, comprising a first aperture;
   a second frame portion, comprising a second aperture, the second frame portion constructed and arranged to couple with the first frame portion such that a portion of the first aperture is aligned with a portion of the second aperture, wherein one of the first frame portion and the second frame portion comprises at least one extension extending from an edge of the one of the first frame portion and the second frame portion; and
   a pole clamp coupled to a first outer side of the at least one extension, the pole clamp constructed and arranged to secure the one of the first frame portion and the second frame portion to a side portion of a support pole.

2. The housing frame of claim 1, wherein coupling of the first and second frame portions aligns a center of the first aperture with a center of the second aperture.

3. The housing frame of claim 1, wherein the first frame portion is constructed and arranged to be positioned at a first side of a curtain and the second frame portion is constructed and arranged to be positioned at a second side of the curtain.

4. The housing frame of claim 1, wherein the first aperture and the second aperture are constructed and arranged for an air duct to pass through them.

5. The housing frame of claim 1, wherein the first frame portion and the second frame portion comprise at least one of a circular shape, a rectangular shape, a square shape and a polygonal shape.

6. The housing frame of claim 1 wherein one of the first frame portion and second frame portion comprises at least one tab and wherein another of the first frame portion and second frame portion comprises at least one slot, and wherein the at least one slot is constructed and arranged to engage the at least one tab when the first and second frame portions are mated.

7. The housing frame of claim 6 wherein the at least one slot and at least one tab comprises multiple slots and multiple corresponding tabs.

8. The housing frame of claim 7 wherein the multiple slots and multiple corresponding tabs are positioned at regular intervals on the first and second frame portions.

9. The housing frame of claim 7 wherein the multiple slots and multiple corresponding tabs are positioned at different intervals on the first and second frame portions.

10. The housing frame of claim 6, wherein the at least one tab and the at least one slot are angled such that a twisting motion of the second frame portion relative to the first frame portion seats the at least one tab within the at least one slot to place the housing frame in a locked position.

11. The housing frame of claim 1, wherein one of the first frame portion and second frame portion comprises at least one first magnet and wherein another of the first frame portion and second frame portion comprises at least one second magnet or at least one magnetically attractive material, and wherein the at least one first magnet is constructed and arranged to engage the at least one second magnet or that at least one magnetically attractive material when the first and second frame portions are coupled.

12. The housing frame of claim 1, wherein at least one of the first frame portion and second frame portion comprises a flange comprising a seat and further comprising:
   an enclosure having an opening at a first end of the enclosure constructed and arranged to be secured at the seat; and
   a coupling mechanism that secures the enclosure to the seat.

13. The housing frame of claim 12, wherein the coupling mechanism comprises at least one of a hose clamp, an elastic band, and a slot that captures a feature of the enclosure.

14. The housing frame of claim 12, wherein the enclosure comprises a flexible fabric.

15. The housing frame of claim 12, wherein a second end of the enclosure comprises a retractable member having an adjustable inner width such that the enclosure is constructed and arranged to be sized to accommodate flexible air ducts of different outer widths.

16. The housing frame of claim 1 further comprising an enclosure coupled at a proximal end, to one of the first frame portion and the second frame portion, the enclosure having an opening between the proximal end and a distal end of the enclosure, the opening at the proximal end of the enclosure corresponding to at least one of the first aperture and the second aperture, the distal end of the enclosure comprising an adjustment mechanism that adjusts a cross-sectional area of the opening at the distal end of the enclosure.

17. The housing frame of claim 16, wherein the enclosure comprises a flexible fabric material.

18. The housing frame of claim 1, wherein the first and second frame portions, when coupled, provide a space region between them sufficient for accommodating a portion of a curtain.

19. The housing frame of claim 1, wherein the pole clamp comprises:
   a first portion coupled to the one of the first frame portion and the second frame portion; and
   a second portion constructed and arranged to be coupled to a curtain support.

20. The housing frame of claim 1, wherein the other of the first frame portion and the second frame portion comprises at least one extension constructed and arranged to align with the at least one extension of the one of the first frame portion and the second frame portion.

21. The housing frame of claim 20, wherein the extension of the other of the first frame portion and the second frame portion comprises one or more protrusions and the extension of the one of the first frame portion and the second frame portion comprises one or more cavities constructed and arranged to removably couple with the one or more protrusions.

22. The housing frame of claim 1, wherein the pole clamp is adjustable such that the pole clamp is constructed and arranged to couple to support poles of different outer widths.

23. The housing frame of claim 1, wherein the first frame portion comprises a base and at least one flange.

24. The housing frame of claim 23, wherein the at least one flange is an internal flange comprising inner dimensions corresponding to inner dimensions of the first aperture, the internal flange extending in a direction transverse to the base.

25. The housing frame of claim 24, wherein the internal flange comprises at least one slot, the at least one slot constructed and arranged to mate with a corresponding tab on the second frame portion.

26. The housing frame of claim 24, wherein the second frame portion comprises an external flange comprising inner dimensions corresponding to inner dimensions of the second aperture and corresponding to outer dimensions of the internal flange of the first frame portion such that the second frame portion is constructed and arranged to mate with the first frame portion.

27. The housing frame of claim 24, wherein the first frame portion comprises a mating flange, the mating flange extending in a direction transverse to the base and constructed and arranged to mate with a corresponding groove on the second frame portion.

28. The housing frame of claim 23, wherein the first frame portion comprises an external flange, the external flange comprises inner dimensions corresponding to inner dimensions of the first aperture, the external flange extending in a direction transverse to the base.

29. A housing frame, comprising:
   a first frame portion, comprising a first aperture;
   a second frame portion, comprising a second aperture, the second frame portion constructed and arranged to couple with the first frame portion such that a portion of the first aperture is aligned with a portion of the second aperture;
   a pole clamp coupled to one of the first frame portion and the second frame portion, the pole clamp constructed and arranged to secure the one of the first frame portion and the second frame portion to a side portion of a support pole,
   wherein one of the first frame portion and second frame portion comprises at least one tab and wherein another of the first frame portion and second frame portion comprises at least one slot, and wherein the at least one slot is constructed and arranged to engage the at least one tab when the first and second frame portions are mated, and
   wherein the at least one tab and the at least one slot are angled such that a twisting motion of the second frame portion relative to the first frame portion seats the at least one tab within the at least one slot to place the housing frame in a locked position.

30. A housing frame, comprising:
   a first frame portion, comprising a first aperture;
   a second frame portion, comprising a second aperture, the second frame portion constructed and arranged to couple with the first frame portion such that a portion of the first aperture is aligned with a portion of the second aperture;
   a pole clamp coupled to one of the first frame portion and the second frame portion, the pole clamp constructed and arranged to secure the one of the first frame portion and the second frame portion to a side portion of a support pole, wherein one of the first frame portion and second frame portion comprises
  a flange comprising a seat and further comprising:
  an enclosure having an opening at a first end of the enclosure constructed and arranged to be secured at the seat; and
  a coupling mechanism that secure the enclosure to the seat.

31. A housing frame, comprising:
a first frame portion, comprising a first aperture;
a second frame portion, comprising a second aperture, the second frame portion constructed and arranged to couple with the first frame portion such that a portion of the first aperture is aligned with a portion of the second aperture;
a pole clamp coupled to one of the first frame portion and the second frame portion, the pole clamp constructed and arranged to secure the one of the first frame portion and the second frame portion to a side portion of a support pole,
an enclosure coupled at a proximal end, to one of the first frame portion and the second frame portion, the enclosure having an opening between the proximal end and a distal end of the enclosure, the opening at the proximal end of the enclosure corresponding to at least one of the first aperture and the second aperture, the distal end of the enclosure comprising an adjustment mechanism that adjusts a cross-sectional are of the opening at the distal end of the enclosure.

32. A housing frame, comprising:
a first frame portion, comprising a first aperture;
a second frame portion, comprising a second aperture, the second frame portion constructed and arranged to couple with the first frame portion such that a portion of the first aperture is aligned with a portion of the second aperture; and
a pole clamp coupled to one of the first frame portion and the second frame portion, the pole clamp constructed and arranged to secure the one of the first frame portion and the second frame portion to a side portion of a support pole,
wherein the first frame portion comprises a base and at least one flange, and
wherein the at least one flange is an internal flange comprising inner dimensions corresponding to inner dimensions of the first aperture, the internal flange extending in a direction transverse to the base.

* * * * *

UNITED STATES PATENT AND TRADEMARK OFFICE
CERTIFICATE OF CORRECTION

PATENT NO. : 12,313,201 B2  
APPLICATION NO. : 17/416646  
DATED : May 27, 2025  
INVENTOR(S) : Jeffrey P. Whittemore Page 1 of 1

It is certified that error appears in the above-identified patent and that said Letters Patent is hereby corrected as shown below:

In the Claims

Column 20, Line 57, Claim 7, remove "comprises" and insert --comprise--

Column 22, Line 62, Claim 30, insert --and-- after "second aperture;"

Column 23, Line 1, Claim 30, insert --at least-- after "wherein" and before "one"

Column 23, Line 7, Claim 30, remove "secure" and insert --secures--

Column 23, Line 20, Claim 31, insert --and-- after "support pole,"

Column 24, Line 4, Claim 31, remove "are" and insert --area--

Signed and Sealed this  
Twelfth Day of August, 2025

Coke Morgan Stewart  
*Acting Director of the United States Patent and Trademark Office*